United States Patent
Kim et al.

(10) Patent No.: US 12,004,029 B2
(45) Date of Patent: Jun. 4, 2024

(54) MOBILITY CONDITION CHANGE BASED ON SERVING CELL QUALITY AND CONNECTION RELEASE

(71) Applicant: LG ELECTRONICS INC., Seoul (KR)

(72) Inventors: Sangwon Kim, Seoul (KR); Youngdae Lee, Seoul (KR); Sunghoon Jung, Seoul (KR); Hongsuk Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 352 days.

(21) Appl. No.: 17/433,926

(22) PCT Filed: Feb. 26, 2020

(86) PCT No.: PCT/KR2020/002731
§ 371 (c)(1),
(2) Date: Aug. 25, 2021

(87) PCT Pub. No.: WO2020/175906
PCT Pub. Date: Sep. 3, 2020

(65) Prior Publication Data
US 2022/0053394 A1 Feb. 17, 2022

(30) Foreign Application Priority Data
Feb. 26, 2019 (KR) .................. 10-2019-0022698

(51) Int. Cl.
*H04W 36/08* (2009.01)
*H04W 36/00* (2009.01)
(Continued)

(52) U.S. Cl.
CPC . *H04W 36/00835* (2018.08); *H04W 36/0058* (2018.08); *H04W 36/32* (2013.01); *H04W 76/34* (2018.02)

(58) Field of Classification Search
CPC ......... H04W 36/0005; H04W 36/0083; H04W 36/00833; H04W 36/00835;
(Continued)

(56) References Cited

U.S. PATENT DOCUMENTS 11,310,715 B2 * 4/2022 Kim ..................... H04W 76/19
2017/0156091 A1 6/2017 Wang et al.
(Continued)

FOREIGN PATENT DOCUMENTS

WO 2012177204 12/2012
WO 2017047831 3/2017

OTHER PUBLICATIONS

Huawei et al., Further discussion on Conditional HO, R2-1800549, 3GPP TSG-RAN2 Meeting #AH-1801, Vancouver, Canada, Jan. 12, 2018, pp. 1-3; and figure 1.
(Continued)

*Primary Examiner* — Siu M Lee
(74) *Attorney, Agent, or Firm* — BRYAN CAVE LEIGHTON PAISNER LLP

(57) ABSTRACT

A method and apparatus for mobility condition change based on serving cell quality and connection release in a wireless communication system is provided. A wireless device receives information on a first condition related to a conditional mobility to a target cell, detects a serving cell problem, performs the conditional mobility to the target cell based on a second condition related to a cell selection, and performs a connection release with the target cell.

10 Claims, 15 Drawing Sheets

(51) Int. Cl.
  *H04W 36/32* (2009.01)
  *H04W 76/34* (2018.01)
(58) Field of Classification Search
  CPC ......... H04W 36/0055; H04W 36/0058; H04W 36/0061; H04W 36/0064; H04W 36/32; H04W 36/324; H04W 36/34; H04W 36/363; H04W 36/362; H04W 76/30; H04W 76/34; H04W 76/38
  See application file for complete search history.

(56) References Cited

U.S. PATENT DOCUMENTS

| 2017/0238228 | A1* | 8/2017 | Zhang | H04W 36/0061 |
| | | | | 370/331 |
| 2020/0137639 | A1* | 4/2020 | Yuan | H04W 36/0011 |
| 2020/0187073 | A1* | 6/2020 | Ma | H04W 36/0038 |
| 2021/0051539 | A1* | 2/2021 | Zhang | H04W 36/38 |
| 2021/0112598 | A1* | 4/2021 | Ryu | H04W 76/27 |
| 2021/0144601 | A1* | 5/2021 | Kazmi | H04W 36/0088 |
| 2021/0266811 | A1* | 8/2021 | Hwang | H04W 28/06 |
| 2022/0201585 | A1* | 6/2022 | Kim | H04W 76/15 |

OTHER PUBLICATIONS

Lenovo, Conditional handover in NR system, R2-1901069, 3GPP TSG-RAN WG2 Meeting #105, Athens, Greece, Feb. 15, 2019, pp. 1-2.
Sections 5.2.3 and 5.2.6 of 3GPP TS 38.304 V15.2.0, Dec. 2018.
Sections 5.3.5.5.2, 5.3.5.8, 5.3.7, 5.3.8, 5.3.9, 5.3.10, 5.5.4.4 and 5.5.4.6 of 3GPP TS 38.331 V15.4.0, Dec. 2018.

* cited by examiner

MOBILITY CONDITION CHANGE BASED ON SERVING CELL QUALITY AND CONNECTION RELEASE

This application is the National Stage filing under 35 U.S.C. 371 of International Application No. PCT/KR2020/002731 filed on Feb. 26, 2020, which claims priority to Korean Patent Application No. 10-2019-0022698 filed on Feb. 26, 2019, the contents of which are all hereby incorporated by reference herein in their entirety.

TECHNICAL FIELD

The present disclosure relates to mobility condition change based on serving cell quality, and connection release.

BACKGROUND 5G new radio (NR) is a new radio access technology (RAT) developed by 3rd generation partnership project (3GPP) for the 5G (fifth generation) mobile network. It was designed to be the global standard for the air interface of 5G networks. The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

In typical wireless cellular systems, the handover mechanism involves reassigning an ongoing session handled by one cell into another. In order to support increased capacity requirement and to enable newer use cases, the next generation wireless systems will have a very dense deployment with advanced beam-forming capability. In such systems, providing a better mobility along with enhanced throughput performance requires an improved handover strategy.

A conditional handover (CHO) mechanism may be introduced for the 5G NR. CHO splits the handover into two parts: communication with source cell is done early and late with the target cell. This may improve the handover robustness significantly.

SUMMARY

A serving cell problem may occur while evaluating conditions for conditional handover to a target cell. If the target cell satisfies a minimum requirement, it may be desirable to perform conditional handover to the target cell even if the target cell does not meet the condition for conditional handover.

In an aspect, a method for a wireless device in a wireless communication system is provided. The method includes receiving information on a first condition related to a conditional mobility to a target cell, detecting a serving cell problem, performing the conditional mobility to the target cell based on a second condition related to a cell selection, and performing a connection release with the target cell.

In another aspect, an apparatus for implementing the above method is provided.

The present disclosure can have various advantageous effects.

For example, the wireless device can autonomously change a serving cell as soon as a serving cell problem happens if there is a suitable target cell.

For example, if a target cell is configured for conditional mobility, upon detecting the serving cell problem, the wireless device can autonomously change a serving cell enough that the target cell is suitable upon cell selection, i.e., the target cell satisfies cell selection criterion S.

For example, if the radio link problem is detected from a serving cell, even though the target cell quality is not very good, but if the target cell quality is suitable for mobility, mobility to the target cell can be performed regardless of the serving cell quality.

For example, the wireless device can avoid radio link failure and continue data transmission/reception without any interruption.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

DETAILED DESCRIPTION

Figure 1:
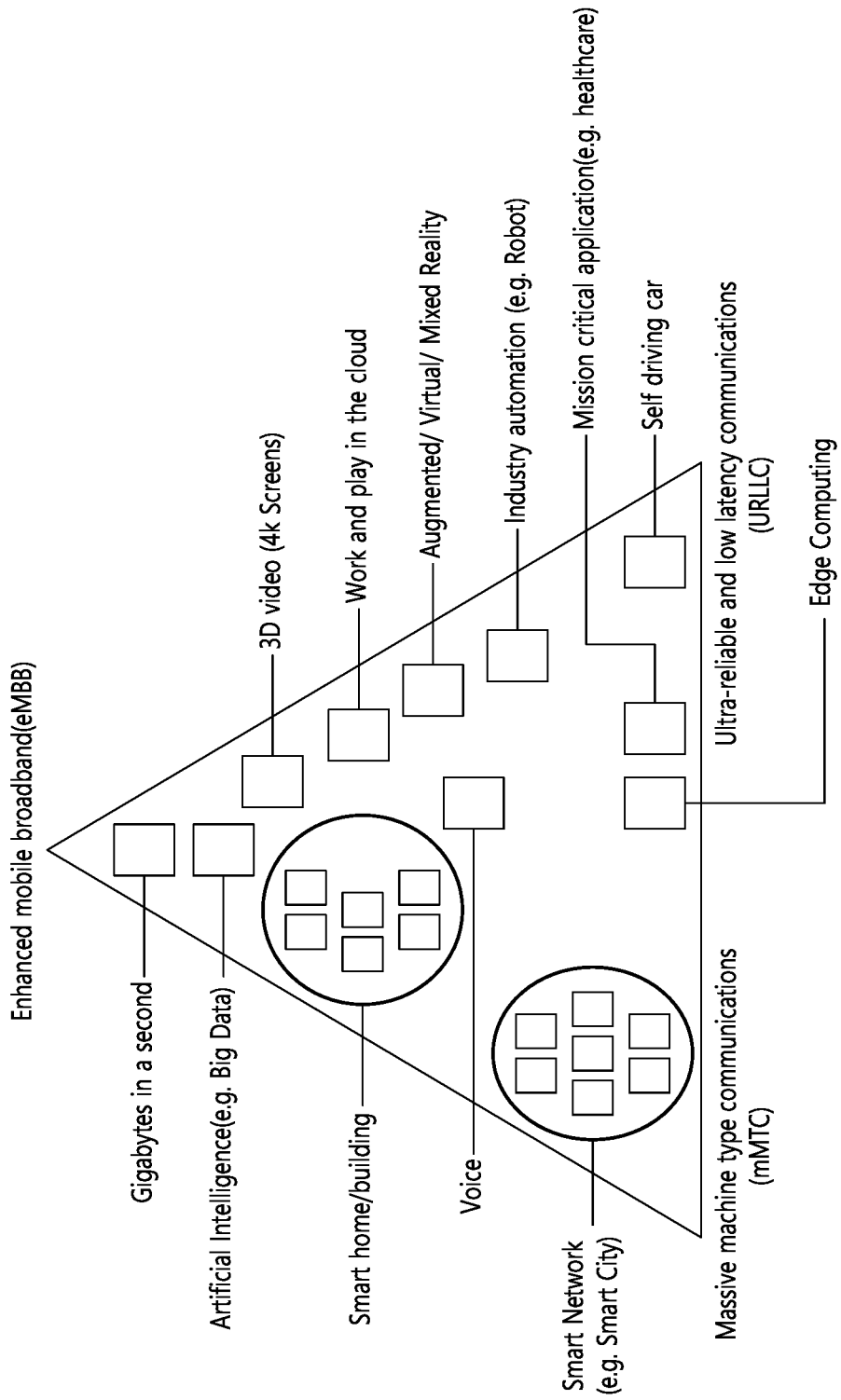
FIG. 1 shows examples of 5G usage scenarios to which the technical features of the present disclosure can be applied.

The technical features described below may be used by a communication standard by the 3rd generation partnership project (3GPP) standardization organization, a communication standard by the institute of electrical and electronics engineers (IEEE), etc. For example, the communication standards by the 3GPP standardization organization include long-term evolution (LTE) and/or evolution of LTE systems. The evolution of LTE systems includes LTE-advanced (LTE-A), LTE-A Pro, and/or 5G new radio (NR). The communication standard by the IEEE standardization organization includes a wireless local area network (WLAN) system such as IEEE 802.11a/b/g/n/ac/ax. The above system uses various multiple access technologies such as orthogonal frequency division multiple access (OFDMA) and/or single carrier frequency division multiple access (SC-FDMA) for downlink (DL) and/or uplink (UL). For example, only OFDMA may be used for DL and only SC-FDMA may be used for UL. Alternatively, OFDMA and SC-FDDMA may be used for DL and/or UL.

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDDCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

FIG. 1 shows examples of 5G usage scenarios to which the technical features of the present disclosure can be applied.

The 5G usage scenarios shown in FIG. 1 are only exemplary, and the technical features of the present disclosure can be applied to other 5G usage scenarios which are not shown in FIG. 1.

Referring to FIG. 1, the three main requirements areas of 5G include (1) enhanced mobile broadband (eMBB) domain, (2) massive machine type communication (mMTC) area, and (3) ultra-reliable and low latency communications (URLLC) area. Some use cases may require multiple areas for optimization and, other use cases may only focus on only one key performance indicator (KPI). 5G is to support these various use cases in a flexible and reliable way.

eMBB focuses on across-the-board enhancements to the data rate, latency, user density, capacity and coverage of mobile broadband access. The eMBB aims ~10 Gbps of throughput. eMBB far surpasses basic mobile Internet access and covers rich interactive work and media and entertainment applications in cloud and/or augmented reality. Data is one of the key drivers of 5G and may not be able to see dedicated voice services for the first time in the 5G era. In 5G, the voice is expected to be processed as an application simply using the data connection provided by the communication system. The main reason for the increased volume of traffic is an increase in the size of the content and an increase in the number of applications requiring high data rates. Streaming services (audio and video), interactive video and mobile Internet connectivity will become more common as more devices connect to the Internet. Many of these applications require always-on connectivity to push real-time information and notifications to the user. Cloud storage and applications are growing rapidly in mobile communication platforms, which can be applied to both work and entertainment. Cloud storage is a special use case that drives growth of uplink data rate. 5G is also used for remote tasks on the cloud and requires much lower end-to-end delay to maintain a good user experience when the tactile interface is used. In entertainment, for example, cloud games and video streaming are another key factor that increases the demand for mobile broadband capabilities. Entertainment is essential in smartphones and tablets anywhere, including high mobility environments such as trains, cars and airplanes. Another use case is augmented reality and information retrieval for entertainment. Here, augmented reality requires very low latency and instantaneous data amount.

mMTC is designed to enable communication between devices that are low-cost, massive in number and battery-driven, intended to support applications such as smart metering, logistics, and field and body sensors. mMTC aims ~10 years on battery and/or ~1 million devices/km2. mMTC allows seamless integration of embedded sensors in all areas and is one of the most widely used 5G applications. Potentially by 2020, internet-of-things (IoT) devices are expected to reach 20.4 billion. Industrial IoT is one of the areas where 5G plays a key role in enabling smart cities, asset tracking, smart utilities, agriculture and security infrastructures.

URLLC will make it possible for devices and machines to communicate with ultra-reliability, very low latency and high availability, making it ideal for vehicular communication, industrial control, factory automation, remote surgery, smart grids and public safety applications. URLLC aims ~1 ms of latency. URLLC includes new services that will change the industry through links with ultra-reliability/low latency, such as remote control of key infrastructure and self-driving vehicles. The level of reliability and latency is essential for smart grid control, industrial automation, robotics, drones control and coordination.

Next, a plurality of use cases included in the triangle of FIG. 1 will be described in more detail.

5G can complement fiber-to-the-home (FTTH) and cable-based broadband (or DOCSIS) as a means of delivering streams rated from hundreds of megabits per second to gigabits per second. This high speed can be required to deliver TVs with resolutions of 4K or more (6K, 8K and above) as well as virtual reality (VR) and augmented reality (AR). VR and AR applications include mostly immersive sporting events. Certain applications may require special network settings. For example, in the case of a VR game, a game company may need to integrate a core server with an edge network server of a network operator to minimize delay.

Automotive is expected to become an important new driver for 5G, with many use cases for mobile communications to vehicles. For example, entertainment for passengers demands high capacity and high mobile broadband at the same time. This is because future users will continue to expect high-quality connections regardless of their location and speed. Another use case in the automotive sector is an augmented reality dashboard. The driver can identify an object in the dark on top of what is being viewed through the front window through the augmented reality dashboard. The augmented reality dashboard displays information that will inform the driver about the object's distance and movement. In the future, the wireless module enables communication between vehicles, information exchange between the vehicle and the supporting infrastructure, and information exchange between the vehicle and other connected devices (e.g., devices accompanied by a pedestrian). The safety system allows the driver to guide the alternative course of action so that he can drive more safely, thereby reducing the risk of accidents. The next step will be a remotely controlled vehicle or self-driving vehicle. This requires a very reliable and very fast communication between different self-driving vehicles and between vehicles and infrastructure. In the future, a self-driving vehicle will perform all driving activities, and the driver will focus only on traffic that the vehicle itself cannot identify. The technical requirements of self-driving vehicles require ultra-low latency and high-speed reliability to increase traffic safety to a level not achievable by humans.

Smart cities and smart homes, which are referred to as smart societies, will be embedded in high density wireless sensor networks. The distributed network of intelligent sensors will identify conditions for cost and energy-efficient maintenance of a city or house. A similar setting can be performed for each home. Temperature sensors, windows and heating controllers, burglar alarms and appliances are all wirelessly connected. Many of these sensors typically require low data rate, low power and low cost. However, for example, real-time high-definition (HD) video may be required for certain types of devices for monitoring.

The consumption and distribution of energy, including heat or gas, is highly dispersed, requiring automated control of distributed sensor networks. The smart grid interconnects these sensors using digital information and communication technologies to collect and act on information. This information can include supplier and consumer behavior, allowing the smart grid to improve the distribution of fuel, such as electricity, in terms of efficiency, reliability, economy, production sustainability, and automated methods. The smart grid can be viewed as another sensor network with low latency.

The health sector has many applications that can benefit from mobile communications. Communication systems can support telemedicine to provide clinical care in remote locations. This can help to reduce barriers to distance and improve access to health services that are not continuously available in distant rural areas. It is also used to save lives in critical care and emergency situations. Mobile communication based wireless sensor networks can provide remote monitoring and sensors for parameters such as heart rate and blood pressure.

Wireless and mobile communications are becoming increasingly important in industrial applications. Wiring costs are high for installation and maintenance. Thus, the possibility of replacing a cable with a wireless link that can be reconfigured is an attractive opportunity in many industries. However, achieving this requires that wireless connections operate with similar delay, reliability, and capacity as cables and that their management is simplified. Low latency and very low error probabilities are new requirements that need to be connected to 5G.

Logistics and freight tracking are important use cases of mobile communications that enable tracking of inventory and packages anywhere using location based information systems. Use cases of logistics and freight tracking typically require low data rates, but require a large range and reliable location information.

Figure 2:
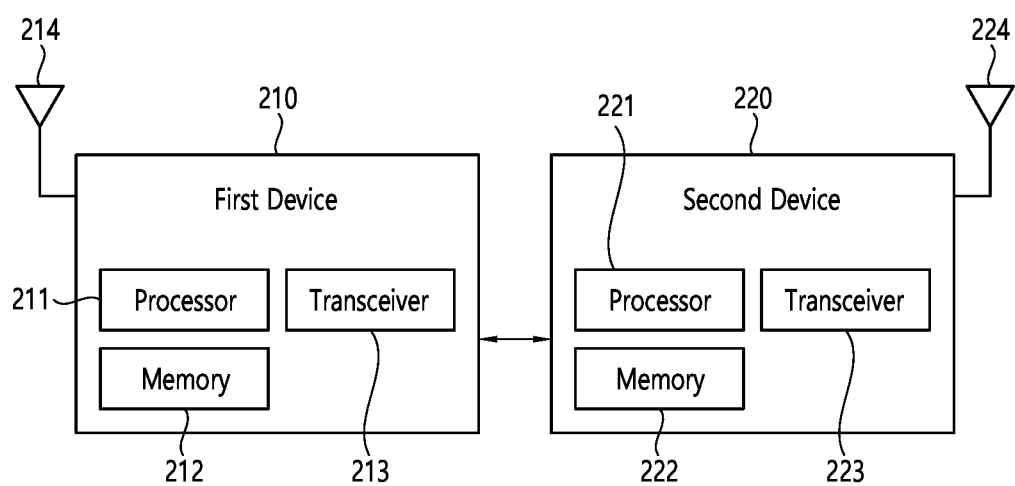
FIG. 2 shows an example of a wireless communication system to which the technical features of the present disclosure can be applied.

FIG. 2 shows an example of a wireless communication system to which the technical features of the present disclosure can be applied.

Referring to FIG. 2, the wireless communication system may include a first device 210 and a second device 220.

The first device 210 includes a base station, a network node, a transmitting UE, a receiving UE, a wireless device, a wireless communication device, a vehicle, a vehicle equipped with an autonomous driving function, a connected car, a drone, an unmanned aerial vehicle (UAV), an artificial intelligence (AI) module, a robot, an AR device, a VR device, a mixed reality (MR) device, a hologram device, a public safety device, an MTC device, an IoT device, a medical device, a fin-tech device (or, a financial device), a security device, a climate/environmental device, a device related to 5G services, or a device related to the fourth industrial revolution.

The second device 220 includes a base station, a network node, a transmitting UE, a receiving UE, a wireless device, a wireless communication device, a vehicle, a vehicle equipped with an autonomous driving function, a connected car, a drone, a UAV, an AI module, a robot, an AR device, a VR device, an MR device, a hologram device, a public safety device, an MTC device, an IoT device, a medical device, a fin-tech device (or, a financial device), a security device, a climate/environmental device, a device related to 5G services, or a device related to the fourth industrial revolution.

For example, the UE may include a mobile phone, a smart phone, a laptop computer, a digital broadcasting terminal, a personal digital assistant (PDA), a portable multimedia player (PMP), a navigation device, a slate personal computer (PC), a tablet PC, an ultrabook, a wearable device (e.g., a smartwatch, a smart glass, a head mounted display (HMD)). For example, the HMD may be a display device worn on the head. For example, the HMD may be used to implement AR, VR and/or MR.

For example, the drone may be a flying object that is flying by a radio control signal without a person boarding it. For example, the VR device may include a device that implements an object or background in the virtual world. For example, the AR device may include a device that implements connection of an object and/or a background of a virtual world to an object and/or a background of the real world. For example, the MR device may include a device that implements fusion of an object and/or a background of a virtual world to an object and/or a background of the real world. For example, the hologram device may include a device that implements a 360-degree stereoscopic image by recording and playing stereoscopic information by utilizing a phenomenon of interference of light generated by the two laser lights meeting with each other, called holography. For example, the public safety device may include a video relay device or a video device that can be worn by the user's body. For example, the MTC device and the IoT device may be a device that do not require direct human intervention or manipulation. For example, the MTC device and the IoT device may include a smart meter, a vending machine, a thermometer, a smart bulb, a door lock and/or various sensors. For example, the medical device may be a device used for the purpose of diagnosing, treating, alleviating, handling, or preventing a disease. For example, the medical device may be a device used for the purpose of diagnosing, treating, alleviating, or correcting an injury or disorder. For example, the medical device may be a device used for the purpose of inspecting, replacing or modifying a structure or function. For example, the medical device may be a device used for the purpose of controlling pregnancy. For example, the medical device may include a treatment device, a surgical device, an (in vitro) diagnostic device, a hearing aid and/or a procedural device, etc. For example, a security device may be a device installed to prevent the risk that may occur and to maintain safety. For example, the security device may include a camera, a closed-circuit TV (CCTV), a recorder, or a black box. For example, the fin-tech device may be a device capable of providing financial services such as mobile payment. For example, the fin-tech device may include a payment device or a point of sales (POS). For example, the climate/environmental device may include a device for monitoring or predicting the climate/environment.

The first device 210 may include at least one or more processors, such as a processor 211, at least one memory, such as a memory 212, and at least one transceiver, such as a transceiver 213. The processor 211 may perform the functions, procedures, and/or methods of the present disclosure described below. The processor 211 may perform one or more protocols. For example, the processor 211 may perform one or more layers of the air interface protocol. The memory 212 is connected to the processor 211 and may store various types of information and/or instructions. The transceiver 213 is connected to the processor 211 and may be controlled to transmit and receive wireless signals.

The second device 220 may include at least one or more processors, such as a processor 221, at least one memory, such as a memory 222, and at least one transceiver, such as a transceiver 223. The processor 221 may perform the functions, procedures, and/or methods of the present disclosure described below. The processor 221 may perform one or more protocols. For example, the processor 221 may perform one or more layers of the air interface protocol. The memory 222 is connected to the processor 221 and may store various types of information and/or instructions. The transceiver 223 is connected to the processor 221 and may be controlled to transmit and receive wireless signals.

The memory 212, 222 may be connected internally or externally to the processor 211, 221, or may be connected to other processors via a variety of technologies such as wired or wireless connections.

The first device 210 and/or the second device 220 may have more than one antenna. For example, antenna 214 and/or antenna 224 may be configured to transmit and receive wireless signals.

Figure 3:
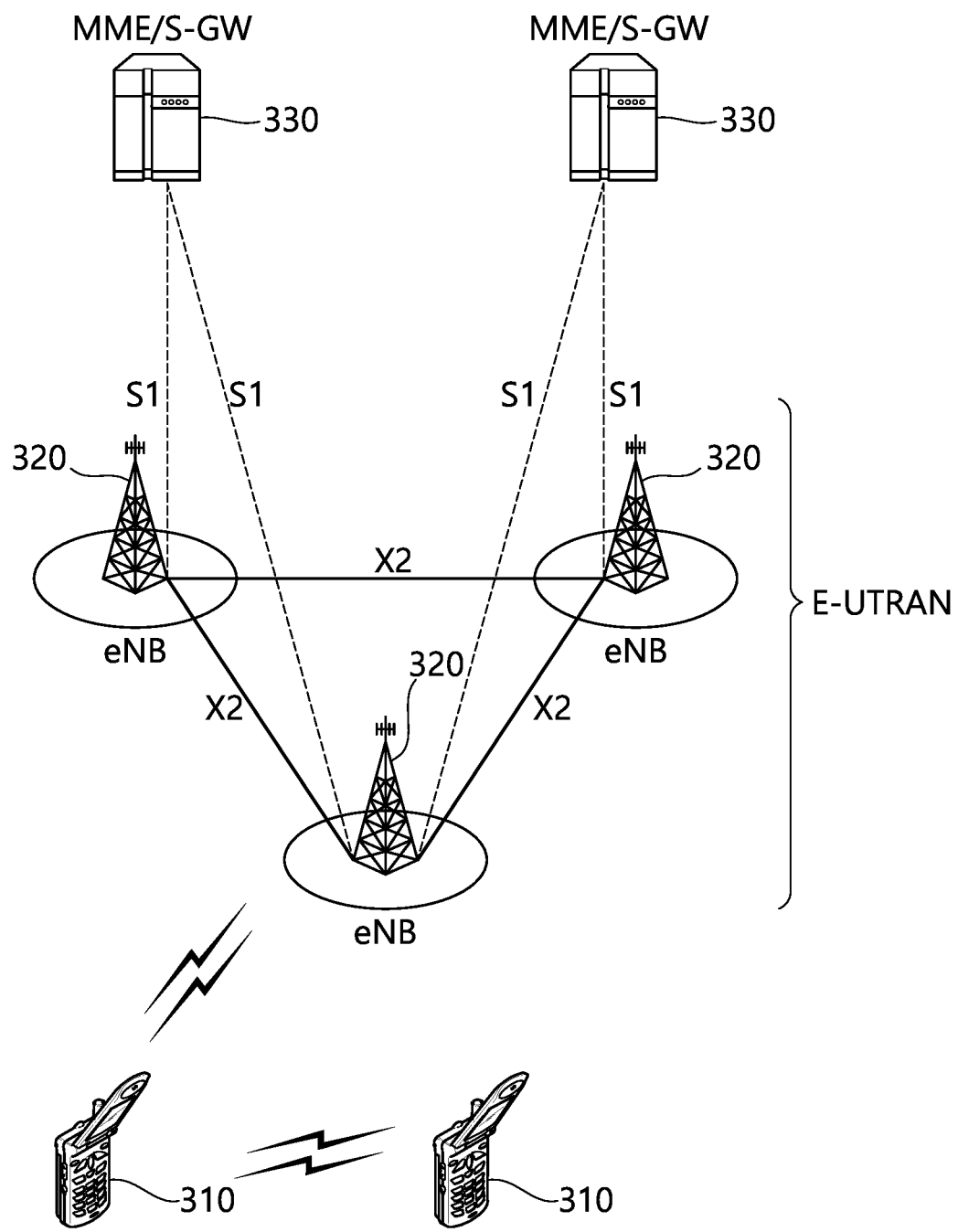
FIG. 3 shows an example of a wireless communication system to which the technical features of the present disclosure can be applied.

FIG. 3 shows an example of a wireless communication system to which the technical features of the present disclosure can be applied.

Specifically, FIG. 3 shows a system architecture based on an evolved-UMTS terrestrial radio access network (E-UTRAN). The aforementioned LTE is a part of an evolved-UTMS (e-UMTS) using the E-UTRAN.

Referring to FIG. 3, the wireless communication system includes one or more user equipment (UE) 310, an E-UTRAN and an evolved packet core (EPC). The UE 310 refers to a communication equipment carried by a user. The UE 310 may be fixed or mobile. The UE 310 may be referred to as another terminology, such as a mobile station (MS), a user terminal (UT), a subscriber station (SS), a wireless device, etc.

The E-UTRAN consists of one or more evolved NodeB (eNB) 320. The eNB 320 provides the E-UTRA user plane and control plane protocol terminations towards the UE 10. The eNB 320 is generally a fixed station that communicates with the UE 310. The eNB 320 hosts the functions, such as inter-cell radio resource management (RRM), radio bearer (RB) control, connection mobility control, radio admission control, measurement configuration/provision, dynamic resource allocation (scheduler), etc. The eNB 320 may be referred to as another terminology, such as a base station (BS), a base transceiver system (BTS), an access point (AP), etc.

A downlink (DL) denotes communication from the eNB 320 to the UE 310. An uplink (UL) denotes communication from the UE 310 to the eNB 320. A sidelink (SL) denotes communication between the UEs 310. In the DL, a transmitter may be a part of the eNB 320, and a receiver may be a part of the UE 310. In the UL, the transmitter may be a part of the UE 310, and the receiver may be a part of the eNB 320. In the SL, the transmitter and receiver may be a part of the UE 310.

The EPC includes a mobility management entity (MME), a serving gateway (S-GW) and a packet data network (PDN) gateway (P-GW). The MME hosts the functions, such as non-access stratum (NAS) security, idle state mobility handling, evolved packet system (EPS) bearer control, etc. The S-GW hosts the functions, such as mobility anchoring, etc. The S-GW is a gateway having an E-UTRAN as an endpoint. For convenience, MME/S-GW 330 will be referred to herein simply as a "gateway," but it is understood that this entity includes both the MME and S-GW. The P-GW hosts the functions, such as UE Internet protocol (IP) address allocation, packet filtering, etc. The P-GW is a gateway having a PDN as an endpoint. The P-GW is connected to an external network.

The UE 310 is connected to the eNB 320 by means of the Uu interface. The UEs 310 are interconnected with each other by means of the PC5 interface. The eNBs 320 are interconnected with each other by means of the X2 interface. The eNBs 320 are also connected by means of the S1 interface to the EPC, more specifically to the MME by means of the S1-MME interface and to the S-GW by means of the S1-U interface. The S1 interface supports a many-to-many relation between MMEs/S-GWs and eNBs.

Figure 4:
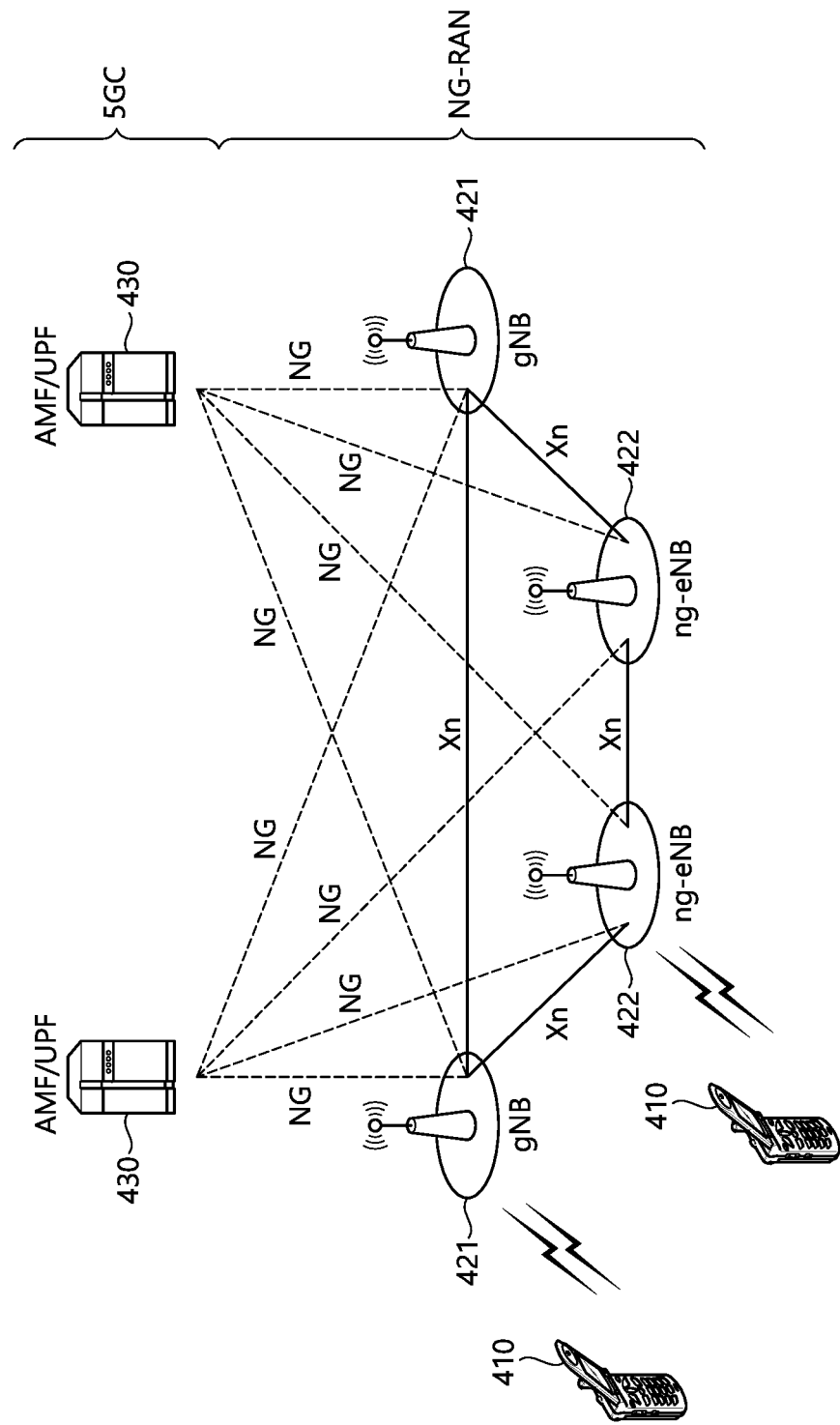
FIG. 4 shows another example of a wireless communication system to which the technical features of the present disclosure can be applied.

FIG. 4 shows another example of a wireless communication system to which the technical features of the present disclosure can be applied.

Specifically, FIG. 4 shows a system architecture based on a 5G NR. The entity used in the 5G NR (hereinafter, simply referred to as "NR") may absorb some or all of the functions of the entities introduced in FIG. 3 (e.g., eNB, MME, S-GW). The entity used in the NR may be identified by the name "NG" for distinction from the LTE/LTE-A.

Referring to FIG. 4, the wireless communication system includes one or more UE 410, a next-generation RAN (NG-RAN) and a 5th generation core network (5GC). The NG-RAN consists of at least one NG-RAN node. The NG-RAN node is an entity corresponding to the eNB 320 shown in FIG. 3. The NG-RAN node consists of at least one gNB 421 and/or at least one ng-eNB 422. The gNB 421 provides NR user plane and control plane protocol terminations towards the UE 410. The ng-eNB 422 provides E-UTRA user plane and control plane protocol terminations towards the UE 410.

The 5GC includes an access and mobility management function (AMF), a user plane function (UPF) and a session management function (SMF). The AMF hosts the functions, such as NAS security, idle state mobility handling, etc. The AMF is an entity including the functions of the conventional MME. The UPF hosts the functions, such as mobility anchoring, protocol data unit (PDU) handling. The UPF an entity including the functions of the conventional S-GW. The SMF hosts the functions, such as UE IP address allocation, PDU session control.

The gNBs 421 and ng-eNBs 422 are interconnected with each other by means of the Xn interface. The gNBs 421 and ng-eNBs 422 are also connected by means of the NG interfaces to the 5GC, more specifically to the AMF by means of the NG-C interface and to the UPF by means of the NG-U interface.

A protocol structure between network entities described above is described. On the system of FIG. 3 and/or FIG. 4, layers of a radio interface protocol between the UE and the network (e.g., NG-RAN and/or E-UTRAN) may be classified into a first layer (L1), a second layer (L2), and a third layer (L3) based on the lower three layers of the open system interconnection (OSI) model that is well-known in the communication system.

NR supports multiple numerology (or, subcarrier spacing (SCS)) to support various 5G services. For example, when the SCS is 15 kHz, wide area in traditional cellular bands may be supported. When the SCS is 30 kHz/60 kHz, dense-urban, lower latency and wider carrier bandwidth may be supported. When the SCS is 60 kHz or higher, a bandwidth greater than 24.25 GHz may be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW).

TABLE 1

| Frequency Range designation | Corresponding frequency range | Subcarrier Spacing |
| --- | --- | --- |
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
| --- | --- | --- |
| FR1 | 410 MHz-7125 MHz | 15, 30, 60kHz |
| FR2 | 24250 MHz-52600 MHz | 60, 120, 240kHz |

Figure 5:
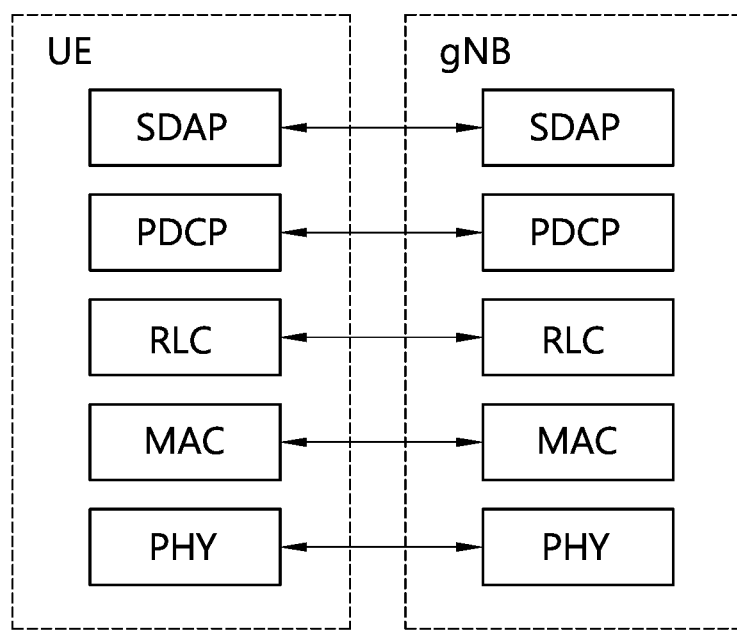
FIG. 5 shows a block diagram of a user plane protocol stack to which the technical features of the present disclosure can be applied.
Figure 6:
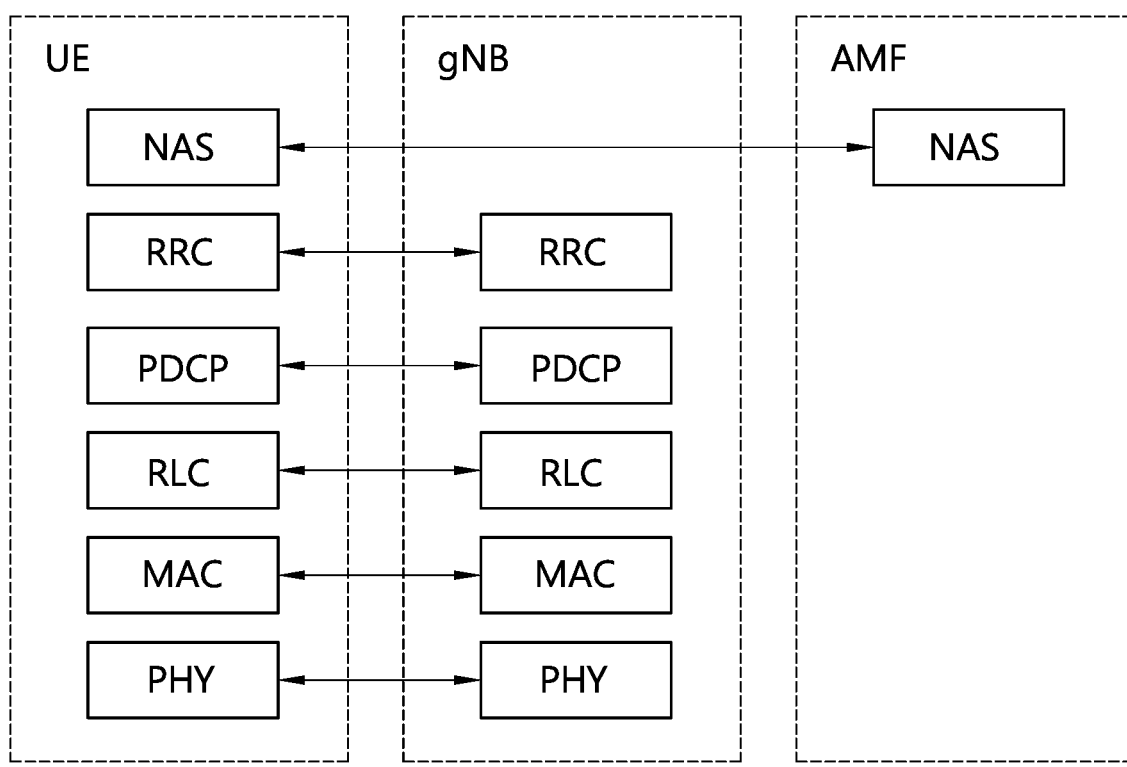
FIG. 6 shows a block diagram of a control plane protocol stack to which the technical features of the present disclosure can be applied.

FIG. 5 shows a block diagram of a user plane protocol stack to which the technical features of the present disclosure can be applied. FIG. 6 shows a block diagram of a control plane protocol stack to which the technical features of the present disclosure can be applied.

The user/control plane protocol stacks shown in FIG. 5 and FIG. 6 are used in NR. However, user/control plane protocol stacks shown in FIG. 5 and FIG. 6 may be used in LTE/LTE-A without loss of generality, by replacing gNB/AMF with eNB/MME.

Referring to FIG. 5 and FIG. 6, a physical (PHY) layer belonging to L1. The PHY layer offers information transfer services to media access control (MAC) sublayer and higher layers. The PHY layer offers to the MAC sublayer transport channels. Data between the MAC sublayer and the PHY layer is transferred via the transport channels. Between different PHY layers, i.e., between a PHY layer of a transmission side and a PHY layer of a reception side, data is transferred via the physical channels.

The MAC sublayer belongs to L2. The main services and functions of the MAC sublayer include mapping between logical channels and transport channels, multiplexing/demultiplexing of MAC service data units (SDUs) belonging to one or different logical channels into/from transport blocks (TB) delivered to/from the physical layer on transport channels, scheduling information reporting, error correction through hybrid automatic repeat request (HARQ), priority handling between UEs by means of dynamic scheduling, priority handling between logical channels of one UE by means of logical channel prioritization (LCP), etc. The MAC sublayer offers to the radio link control (RLC) sublayer logical channels.

The RLC sublayer belong to L2. The RLC sublayer supports three transmission modes, i.e. transparent mode (TM), unacknowledged mode (UM), and acknowledged mode (AM), in order to guarantee various quality of services (QoS) required by radio bearers. The main services and functions of the RLC sublayer depend on the transmission mode. For example, the RLC sublayer provides transfer of upper layer PDUs for all three modes, but provides error correction through ARQ for AM only. In LTE/LTE-A, the RLC sublayer provides concatenation, segmentation and reassembly of RLC SDUs (only for UM and AM data transfer) and re-segmentation of RLC data PDUs (only for AM data transfer). In NR, the RLC sublayer provides segmentation (only for AM and UM) and re-segmentation (only for AM) of RLC SDUs and reassembly of SDU (only for AM and UM). That is, the NR does not support concatenation of RLC SDUs. The RLC sublayer offers to the packet data convergence protocol (PDCP) sublayer RLC channels.

The PDCP sublayer belong to L2. The main services and functions of the PDCP sublayer for the user plane include header compression and decompression, transfer of user data, duplicate detection, PDCP PDU routing, retransmission of PDCP SDUs, ciphering and deciphering, etc. The main services and functions of the PDCP sublayer for the control plane include ciphering and integrity protection, transfer of control plane data, etc.

The service data adaptation protocol (SDAP) sublayer belong to L2. The SDAP sublayer is only defined in the user plane. The SDAP sublayer is only defined for NR. The main services and functions of SDAP include, mapping between a QoS flow and a data radio bearer (DRB), and marking QoS flow ID (QFI) in both DL and UL packets. The SDAP sublayer offers to 5GC QoS flows.

A radio resource control (RRC) layer belongs to L3. The RRC layer is only defined in the control plane. The RRC layer controls radio resources between the UE and the network. To this end, the RRC layer exchanges RRC messages between the UE and the BS. The main services and functions of the RRC layer include broadcast of system information related to AS and NAS, paging, establishment, maintenance and release of an RRC connection between the UE and the network, security functions including key management, establishment, configuration, maintenance and release of radio bearers, mobility functions, QoS management functions, UE measurement reporting and control of the reporting, NAS message transfer to/from NAS from/to UE.

In other words, the RRC layer controls logical channels, transport channels, and physical channels in relation to the configuration, reconfiguration, and release of radio bearers. A radio bearer refers to a logical path provided by L1 (PHY layer) and L2 (MAC/RLC/PDCP/SDAP sublayer) for data transmission between a UE and a network. Setting the radio bearer means defining the characteristics of the radio protocol layer and the channel for providing a specific service, and setting each specific parameter and operation method. Radio bearer may be divided into signaling RB (SRB) and data RB (DRB). The SRB is used as a path for transmitting RRC messages in the control plane, and the DRB is used as a path for transmitting user data in the user plane.

An RRC state indicates whether an RRC layer of the UE is logically connected to an RRC layer of the E-UTRAN. In LTE/LTE-A, when the RRC connection is established between the RRC layer of the UE and the RRC layer of the E-UTRAN, the UE is in the RRC connected state (RRC_CONNECTED). Otherwise, the UE is in the RRC idle state (RRC_IDLE). In NR, the RRC inactive state (RRC_INACTIVE) is additionally introduced. RRC_INACTIVE may be used for various purposes. For example, the massive machine type communications (MMTC) UEs can be efficiently managed in RRC_INACTIVE. When a specific condition is satisfied, transition is made from one of the above three states to the other.

A predetermined operation may be performed according to the RRC state. In RRC_IDLE, public land mobile network (PLMN) selection, broadcast of system information (SI), cell re-selection mobility, core network (CN) paging and discontinuous reception (DRX) configured by NAS may be performed. The UE shall have been allocated an identifier (ID) which uniquely identifies the UE in a tracking area. No RRC context stored in the BS.

In RRC_CONNECTED, the UE has an RRC connection with the network (i.e. E-UTRAN/NG-RAN). Network-CN connection (both C/U-planes) is also established for UE. The UE AS context is stored in the network and the UE. The RAN knows the cell which the UE belongs to. The network can transmit and/or receive data to/from UE. Network controlled mobility including measurement is also performed.

Most of operations performed in RRC_IDLE may be performed in RRC_INACTIVE. But, instead of CN paging in RRC_IDLE, RAN paging is performed in RRC_INACTIVE. In other words, in RRC_IDLE, paging for mobile terminated (MT) data is initiated by core network and paging area is managed by core network. In RRC_INACTIVE, paging is initiated by NG-RAN, and RAN-based notification area (RNA) is managed by NG-RAN. Further, instead of DRX for CN paging configured by NAS in RRC_IDLE, DRX for RAN paging is configured by NG-RAN in RRC_INACTIVE. Meanwhile, in RRC_INACTIVE, 5GC-NG-RAN connection (both C/U-planes) is established for UE, and the UE AS context is stored in NG-RAN and the UE. NG-RAN knows the RNA which the UE belongs to.

NAS layer is located at the top of the RRC layer. The NAS control protocol performs the functions, such as authentication, mobility management, security control.

Figure 7:
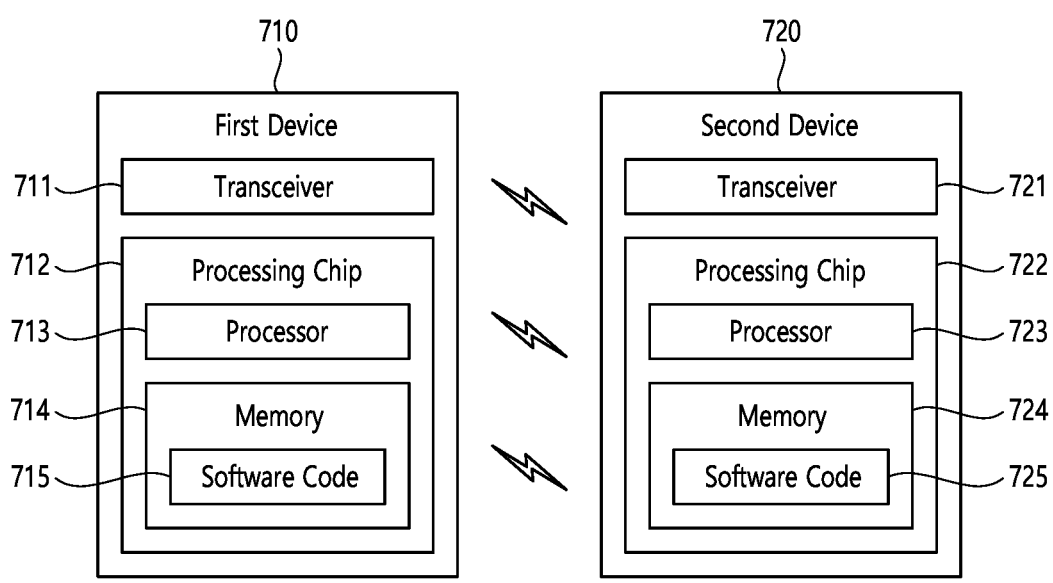
FIG. 7 shows another example of a wireless communication system to which the technical features of the present disclosure can be applied.

FIG. 7 shows another example of a wireless communication system to which the technical features of the present disclosure can be applied.

Referring to FIG. 7, wireless devices 710 and 720 may correspond to the wireless devices 210 and 220 of FIG. 2 and may be configured by various elements, components, units/portions, and/or modules.

The first wireless device 710 may include at least one transceiver, such as a transceiver 711, and at least one processing chip, such as a processing chip 712. The processing chip 712 may include at least one processor, such a processor 713, and at least one memory, such as a memory 714. The memory 714 may be operably connectable to the processor 713. The memory 714 may store various types of information and/or instructions. The memory 714 may store a software code 715 which implements instructions that, when executed by the processor 713, perform the descriptions, functions, procedures, suggestions, methods and/or operational flowcharts disclosed in the present disclosure. For example, the software code 715 may implement instructions that, when executed by the processor 713, perform the descriptions, functions, procedures, suggestions, methods and/or operational flowcharts disclosed in the present disclosure. For example, the software code 715 may control the processor 713 to perform one or more protocols. For example, the software code 715 may control the processor 713 may perform one or more layers of the radio interface protocol.

The second wireless device 720 may include at least one transceiver, such as a transceiver 721, and at least one processing chip, such as a processing chip 722. The processing chip 722 may include at least one processor, such a processor 723, and at least one memory, such as a memory 724. The memory 724 may be operably connectable to the processor 723. The memory 724 may store various types of information and/or instructions. The memory 724 may store a software code 725 which implements instructions that, when executed by the processor 723, perform the descriptions, functions, procedures, suggestions, methods and/or operational flowcharts disclosed in the present disclosure. For example, the software code 725 may implement instructions that, when executed by the processor 723, perform the descriptions, functions, procedures, suggestions, methods and/or operational flowcharts disclosed in the present disclosure. For example, the software code 725 may control the processor 723 to perform one or more protocols. For example, the software code 725 may control the processor 723 may perform one or more layers of the radio interface protocol.

Figure 8:
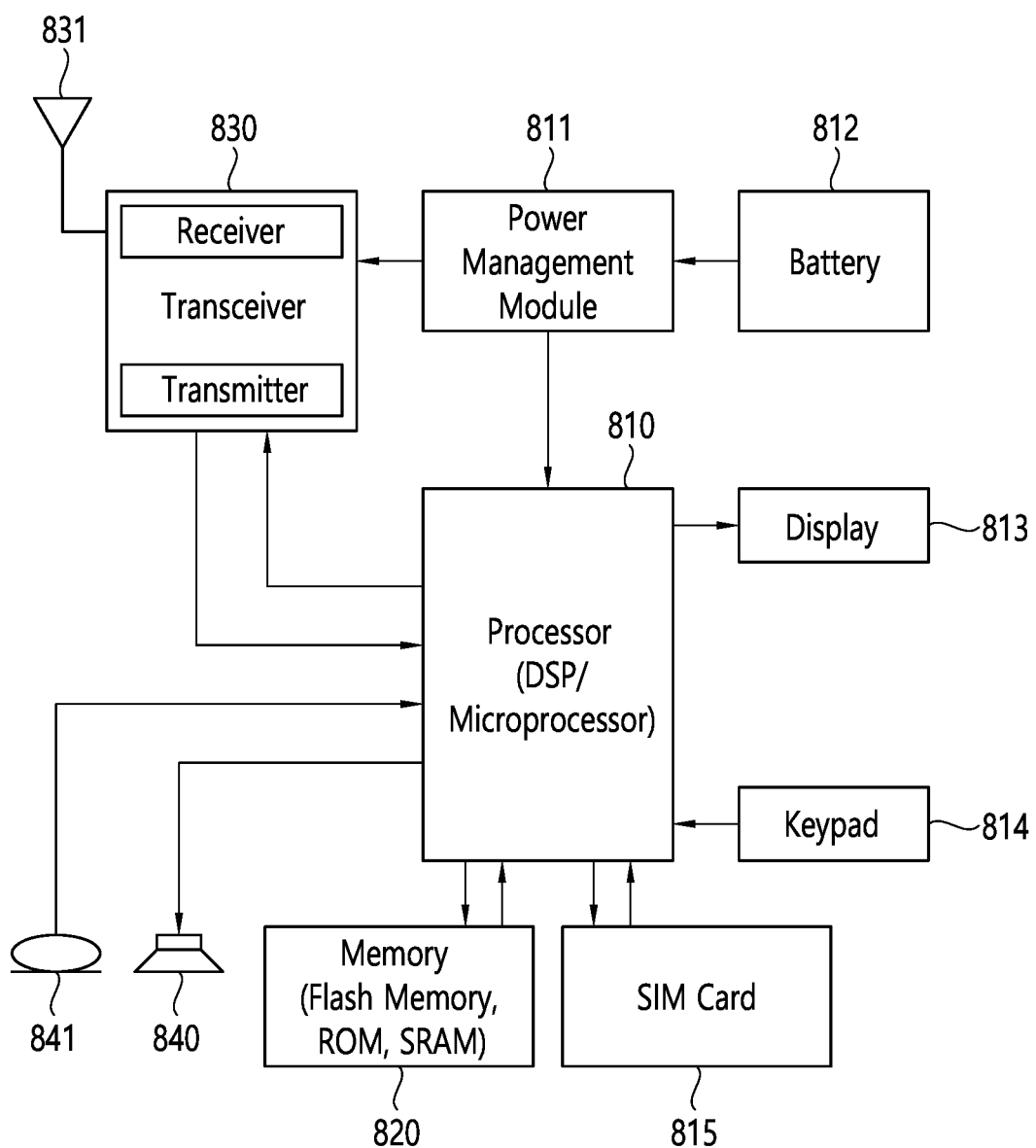
FIG. 8 shows a UE to which the technical features of the present disclosure can be applied.

FIG. 8 shows a UE to which the technical features of the present disclosure can be applied.

A UE includes a processor 810, a power management module 811, a battery 812, a display 813, a keypad 814, a subscriber identification module (SIM) card 815, a memory 820, a transceiver 830, one or more antennas 831, a speaker 840, and a microphone 841.

The processor 810 may be configured to implement the descriptions, functions, procedures, suggestions, methods and/or operational flowcharts disclosed in the present disclosure. The processor 810 may be configured to control one or more other components of the UE to implement the descriptions, functions, procedures, suggestions, methods and/or operational flowcharts disclosed in the present disclosure. Layers of the radio interface protocol may be implemented in the processor 810. The processor 810 may include ASIC, other chipset, logic circuit and/or data processing device. The processor 810 may be an application processor. The processor 810 may include at least one of a digital signal processor (DSP), a central processing unit (CPU), a graphics processing unit (GPU), a modem (modulator and demodulator). An example of the processor 810 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The power management module 811 manages power for the processor 810 and/or the transceiver 830. The battery 812 supplies power to the power management module 811. The display 813 outputs results processed by the processor 810. The keypad 814 receives inputs to be used by the processor 810. The keypad 814 may be shown on the display 813. The SIM card 815 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The memory 820 is operatively coupled with the processor 810 and stores a variety of information to operate the processor 810. The memory 820 may include read-only memory (ROM), random access memory (RAM), flash memory, memory card, storage medium and/or other storage device. When the embodiments are implemented in software, the techniques described herein can be implemented with modules (e.g., procedures, functions, and so on) that perform the functions described herein. The modules can be stored in the memory 820 and executed by the processor 810. The memory 820 can be implemented within the processor 810 or external to the processor 810 in which case those can be communicatively coupled to the processor 810 via various means as is known in the art.

The transceiver 830 is operatively coupled with the processor 810, and transmits and/or receives a radio signal. The transceiver 830 includes a transmitter and a receiver. The transceiver 830 may include baseband circuitry to process radio frequency signals. The transceiver 830 controls the one or more antennas 831 to transmit and/or receive a radio signal.

The speaker 840 outputs sound-related results processed by the processor 810. The microphone 841 receives sound-related inputs to be used by the processor 810.

Reconfiguration with sync is described. Section 5.3.5.5.2 and Section 5.3.5.8 of 3GPP TS 38.331 V15.4.0 (2018-12) can be referred.

The UE shall perform the following actions to execute a reconfiguration with sync.

1> if the security is not activated, perform the actions upon going to RRC_IDLE with the release cause 'other' upon which the procedure ends;
1> stop timer T310 for the corresponding SpCell, if running;
1> start timer T304 for the corresponding SpCell with the timer value set to t304, as included in the reconfigurationWithSync;
1> if the frequencyInfoDL is included:
2> consider the target SpCell to be one on the SSB frequency indicated by the frequencyInfoDL with a physical cell identity indicated by the physCellId;
1> else:
2> consider the target SpCell to be one on the SSB frequency of the source SpCell with a physical cell identity indicated by the physCellId;
1> start synchronising to the DL of the target SpCell;
1> apply the specified BCCH configuration;
1> acquire the MIB;
1> reset the MAC entity of this cell group;
1> consider the SCell(s) of this cell group, if configured, to be in deactivated state;
1> apply the value of the newUE-Identity as the cell radio network temporary identifier (C-RNTI) for this cell group;
1> configure lower layers in accordance with the received spCellConfigCommon;
1> configure lower layers in accordance with any additional fields, not covered in the previous, if included in the received reconfigurationWithSync.

The UE should perform the reconfiguration with sync as soon as possible following the reception of the RRC message triggering the reconfiguration with sync, which could be before confirming successful reception (HARQ and ARQ) of this message.

The UE may omit reading the MIB if the UE already has the required timing information, or the timing information is not needed for random access.

When the UE is unable to comply with RRCReconfiguration, the UE shall:
1> if the UE is operating in E-UTRAN-NR dual connectivity (EN-DC):
2> if the UE is unable to comply with (part of) the configuration included in the RRCReconfiguration message received over SRB3;
3> continue using the configuration used prior to the reception of RRCReconfiguration message;
3> initiate the SCG failure information procedure to report SCG reconfiguration error, upon which the connection reconfiguration procedure ends;
2> else, if the UE is unable to comply with (part of) the configuration included in the RRCReconfiguration message received over SRB1;
3> continue using the configuration used prior to the reception of RRCReconfiguration message;
3> initiate the connection re-establishment procedure, upon which the connection reconfiguration procedure ends.
1> else if RRCReconfiguration is received via NR:
2> if the UE is unable to comply with (part of) the configuration included in the RRCReconfiguration message;
3> continue using the configuration used prior to the reception of RRCReconfiguration message;
3> if security has not been activated:
4> perform the actions upon going to RRC_IDLE, with release cause 'other'
3> else if AS security has been activated but SRB2 and at least one DRB have not been setup:
4> perform the actions upon going to RRC_IDLE, with release cause 'RRC connection failure';
3> else:
4> initiate the connection re-establishment procedure, upon which the reconfiguration procedure ends;
1> else if RRCReconfiguration is received via other RAT (handover to NR failure):
2> if the UE is unable to comply with any part of the configuration included in the RRCReconfiguration message:
3> perform the actions defined for this failure case applicable for the other RAT.

The UE may apply above failure handling also in case the RRCReconfiguration message causes a protocol error for which the generic error handling specifies that the UE shall ignore the message.

If the UE is unable to comply with part of the configuration, it does not apply any part of the configuration, i.e., there is no partial success/failure.

Upon T304 expiry (i.e., reconfiguration with sync failure), the UE shall:
1> if T304 of the MCG expires:
2> release dedicated preambles provided in rach-ConfigDedicated if configured;
2> revert back to the UE configuration (which may include state variables and parameters of each radio bearer) used in the source PCell;
2> initiate the connection re-establishment procedure.
1> else if T304 of a secondary cell group expires:
2> release dedicated preambles provided in rach-ConfigDedicated, if configured;
2> initiate the SCG failure information procedure to report SCG reconfiguration with sync failure, upon which the RRC reconfiguration procedure ends;
1> else if T304 expires when RRCReconfiguration is received via other RAT (handover to NR failure):
2> reset MAC;
2> perform the actions defined for this failure case applicable for the other RAT.

RRC connection re-establishment is described. Section 5.3.7 of 3GPP TS 38.331 V15.4.0 (2018-12) can be referred.

The purpose of this procedure is to re-establish the RRC connection. A UE in RRC_CONNECTED, for which security has been activated with SRB2 and at least one DRB setup, may initiate the procedure in order to continue the RRC connection. The connection re-establishment succeeds if the network is able to find and verify a valid UE context or, if the UE context cannot be retrieved, and the network responds with an RRCSetup. If AS security has not been activated, the UE does not initiate the procedure but instead moves to RRC_IDLE directly, with release cause 'other'. If AS security has been activated, but SRB2 and at least one DRB are not setup, the UE does not initiate the procedure but instead moves to RRC_IDLE directly, with release cause 'RRC connection failure'.

The network applies the procedure as follows:
> When AS security has been activated and the network retrieves or verifies the UE context:
>> to re-activate AS security without changing algorithms;
>> to re-establish and resume the SRB1;
> When UE is re-establishing an RRC connection, and the network is not able to retrieve or verify the UE context:
>> to discard the stored AS Context and release all RB;
>> fallback to establish a new RRC connection.

The UE initiates the procedure when one of the following conditions is met:
1> upon detecting radio link failure of the MCG; or
1> upon re-configuration with sync failure of the MCG; or
1> upon mobility from NR failure; or
1> upon integrity check failure indication from lower layers concerning SRB1 or SRB2, except if the integrity check failure is detected on the RRCReestablishment message; or
1> upon an RRC connection reconfiguration failure.

Upon initiation of the procedure, the UE shall:
1> stop timer T310, if running;
1> stop timer T304, if running;
1> start timer T311;
1> suspend all RBs, except SRB0;
1> reset MAC;
1> release the MCG SCell(s), if configured;
1> release the current dedicated ServingCell configuration;
1> release delayBudgetReportingConfig, if configured, and stop timer T342, if running;
1> release overheatingAssistanceConfig, if configured and stop timer T345, if running;
1> perform cell selection in accordance with the cell selection process which will be described below in detail.

Upon selecting a suitable NR cell, the UE shall:
1> ensure having valid and up to date essential system information;
1> stop timer T311;
1> start timer T301;
1> if T390 is running:
2> stop timer T390 for all access categories;
2> perform the actions for barring alleviation;
1> apply the default L1 parameter values as specified in corresponding physical layer specifications except for the parameters for which values are provided in SIB1;
1> apply the default MAC Cell Group configuration;

1> apply the timeAlignmentTimerCommon included in SIB1;
1> initiate transmission of the RRCReestablishmentRequest message;

This procedure applies also if the UE returns to the source PCell.

Upon initiating an inter-RAT cell, the UE shall:
1> perform the actions upon going to RRC_IDLE, with release cause 'RRC connection failure'.

The UE shall set the contents of RRCReestablishmentRequest message as follows:
1> set the ue-Identity as follows:
2> set the c-RNTI to the cell radio network temporary identity (C-RNTI) used in the source PCell (reconfiguration with sync or mobility from NR failure) or used in the PCell in which the trigger for the re-establishment occurred (other cases);
2> set the physCellId to the physical cell identity of the source PCell (reconfiguration with sync or mobility from NR failure) or of the PCell in which the trigger for the re-establishment occurred (other cases);
2> set the shortMAC-I to the 16 least significant bits of the MAC-I calculated:
3> over the ASN.1 encoded (i.e., a multiple of 8 bits) VarShortMAC-Input;
3> with the $K_{RRCint}$ key and integrity protection algorithm that was used in the source PCell (reconfiguration with sync or mobility from NR failure) or of the PCell in which the trigger for the re-establishment occurred (other cases); and
3> with all input bits for COUNT, BEARER and DIRECTION set to binary ones;
1> set the reestablishmentCause as follows:
2> if the re-establishment procedure was initiated due to reconfiguration failure:
3> set the reestablishmentCause to the value reconfigurationFailure;
2> else if the re-establishment procedure was initiated due to reconfiguration with sync failure (intra-NR handover failure or inter-RAT mobility from NR failure):
3> set the reestablishmentCause to the value handoverFailure;
2> else:
3> set the reestablishmentCause to the value otherFailure;
1> re-establish PDCP for SRB1;
1> re-establish RLC for SRB1;
1> apply the specified configuration for SRB1;
1> configure lower layers to suspend integrity protection and ciphering for SRB1;

Ciphering is not applied for the subsequent RRCReestablishment message used to resume the connection. An integrity check is performed by lower layers, but merely upon request from RRC.
1> resume SRB1;
1> submit the RRCReestablishmentRequest message to lower layers for transmission.

Upon receiving of the RRCReestablishment by the UE, the UE shall:
1> stop timer T301;
1> consider the current cell to be the PCell;
1> store the nextHopChainingCount value indicated in the RRCReestablishment message;
1> update the $K_{gNB}$ key based on the current $K_{gNB}$ or the NH, using the stored nextHopChainingCount value;
1> derive $K_{RRCenc}$ and $K_{UPenc}$ key associated with the previously configured cipheringAlgorithm;
1> derive the $K_{RRCint}$ and $K_{UPint}$ key associated with the previously configured integrityProtAlgorithm.
1> request lower layers to verify the integrity protection of the RRCReestablishment message, using the previously configured algorithm and the $K_{RRCint}$ key;
1> if the integrity protection check of the RRCReestablishment message fails:
2> perform the actions upon going to RRC_IDLE, with release cause 'RRC connection failure', upon which the procedure ends;
1> configure lower layers to resume integrity protection for SRB1 using the previously configured algorithm and the $K_{RRCint}$ key immediately, i.e., integrity protection shall be applied to all subsequent messages received and sent by the UE, including the message used to indicate the successful completion of the procedure;
1> configure lower layers to resume ciphering for SRB1 using the previously configured algorithm and, the $K_{RRCenc}$ key immediately, i.e., ciphering shall be applied to all subsequent messages received and sent by the UE, including the message used to indicate the successful completion of the procedure;
1> release the measurement gap configuration indicated by the measGapConfig, if configured;
1> submit the RRCReestablishmentComplete message to lower layers for transmission;
1> the procedure ends.

Upon T311 expiry, the UE shall:
1> perform the actions upon going to RRC_IDLE, with release cause 'RRC connection failure'.

The UE shall:
1> if timer T301 expires; or
1> if the selected cell becomes no longer suitable according to the cell selection criteria:
2> perform the actions upon going to RRC_IDLE, with release cause 'RRC connection failure'.

Upon reception of the RRCSetup by the UE, the UE shall:
1> perform the RRC connection establishment procedure.

RRC connection release is described. Section 5.3.8 and Section 5.3.9 of 3GPP TS 38.331 V15.4.0 (2018-12) can be referred.

Figure 9:
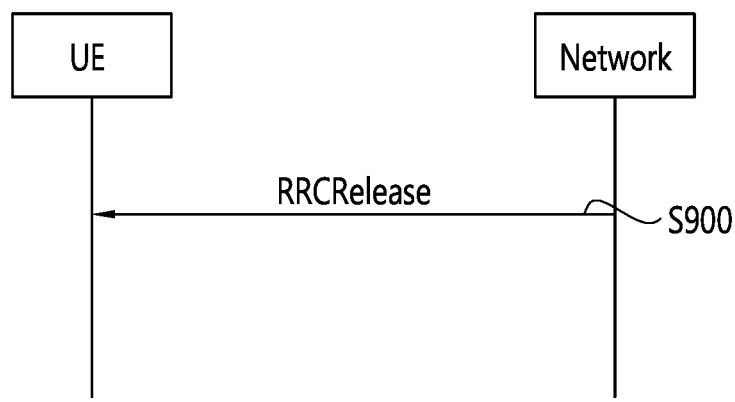
FIG. 9 shows an example of RRC connection release to which the technical features of the present disclosure can be applied.

FIG. 9 shows an example of RRC connection release to which the technical features of the present disclosure can be applied.

The purpose of this procedure is:
to release the RRC connection, which includes the release of the established radio bearers as well as all radio resources; or
to suspend the RRC connection only if SRB2 and at least one DRB is setup, which includes the suspension of the established radio bearers.

In step S900, the network transmits the RRCRelease message to the UE. The network initiates the RRC connection release procedure to transit a UE in RRC_CONNECTED to RRC_IDLE; or to transit a UE in RRC_CONNECTED to RRC_INACTIVE only if SRB2 and at least one DRB is setup in RRC_CONNECTED; or to transit a UE in RRC_INACTIVE back to RRC_INACTIVE when the UE tries to resume; or to transit a UE in RRC_INACTIVE to RRC_IDLE when the UE tries to resume. The procedure can also be used to release and redirect a UE to another frequency.

Upon reception of the RRCRelease by the UE, the UE shall:
1> delay the following actions defined in this sub-clause 60 ms from the moment the RRCRelease message was received or optionally when lower layers indicate that the receipt of the RRCRelease message has been successfully acknowledged, whichever is earlier;
1> stop timer T380, if running;
1> stop timer T320, if running;
1> stop timer T390, if running;
1> if the security is not activated, perform the actions upon going to RRC_IDLE with the release cause 'other' upon which the procedure ends;
1> if the RRCRelease message includes redirectedCarrierInfo indicating redirection to eutra:
2> if cnType is included:
3> after the cell selection, indicate the available CN Type(s) and the received cnType to upper layers;
1> if the RRCRelease message includes the cellReselectionPriorities:
2> store the cell reselection priority information provided by the cellReselectionPriorities;
2> if the t320 is included:
3> start timer T320, with the timer value set according to the value of t320;
1> else:
2> apply the cell reselection priority information broadcast in the system information;
1> if deprioritisationReq is included:
2> start or restart timer T325 with the timer value set to the deprioritisationTimer signaled;
2> store the deprioritisationReq until T325 expiry;
1> if the RRCRelease includes suspendConfig:
2> apply the received suspendConfig;
2> reset MAC and release the default MAC Cell Group configuration, if any;
2> re-establish RLC entities for SRB1;
2> if the RRCRelease message with suspendConfig was received in response to an RRCResumeRequest or an RRCResumeRequest1:
3> stop the timer T319 if running;
3> in the stored UE Inactive AS context:
4> replace the $K_{gNB}$ and $K_{RRCint}$ keys with the current $K_{gNB}$ and $K_{RRCint}$ keys;
4> replace the C-RNTI with the temporary C-RNTI in the cell the UE has received the RRCRelease message;
4> replace the cellIdentity with the cellIdentity of the cell the UE has received the RRCRelease message;
4> replace the physical cell identity with the physical cell identity of the cell the UE has received the RRCRelease message;
4> replace the suspendConfig with the current suspendConfig;
2> else:
3> store in the UE Inactive AS Context the received suspendConfig, all current parameters configured with RRCReconfiguration or RRCResume, the current $K_{gNB}$ and $K_{RRCint}$ keys, the ROHC state, the C-RNTI used in the source PCell, the cellIdentity and the physical cell identity of the source PCell;
2> suspend all SRB(s) and DRB(s), except SRB0;
2> indicate PDCP suspend to lower layers of all DRBs;
2> if the t380 is included:
3> start timer T380, with the timer value set to t380;
2> if the RRCRelease message is including the waitTime:
3> start timer T302 with the value set to the waitTime;
3> inform the upper layer that access barring is applicable for all access categories except categories '0' and '2';
2> indicate the suspension of the RRC connection to upper layers;
2> enter RRC_INACTIVE and perform cell selection;

1> else
2> perform the actions upon going to RRC_, with the release cause 'other'.
The UE shall:
1> if T320 expires:
2> if stored, discard the cell reselection priority information provided by the cellReselectionPriorities or inherited from another RAT;
2> apply the cell reselection priority information broadcast in the system information.

Upon receiving the expiry of DataInactivityTimer from lower layers while in RRC_CONNECTED, the UE shall:
1> perform the actions upon going to RRC_IDLE, with release cause 'RRC connection failure'.

The purpose of RRC connection release requested by upper layers is to release the RRC connection. Access to the current PCell may be barred as a result of this procedure.

The UE initiates the procedure when upper layers request the release of the RRC connection. The UE shall not initiate the procedure for power saving purposes.
The UE shall:
1> if the upper layers indicate barring of the PCell:
2> treat the PCell used prior to entering RRC_IDLE as barred;
1> perform the actions upon going to RRC_IDLE, with release cause 'other'.

Radio link failure is described. Section 5.3.10 of 3GPP TS 38.331 V15.4.0 (2018-12) can be referred.

For detection of physical layer problems in RRC_CONNECTED, the UE shall:
1> upon receiving N310 consecutive "out-of-sync" indications for the SpCell from lower layers while neither T300, T301, T304, T311 nor T319 are running:
2> start timer T310 for the corresponding SpCell.

For recovery of physical layer problems, upon receiving N311 consecutive "in-sync" indications for the SpCell from lower layers while T310 is running, the UE shall:
1> stop timer T310 for the corresponding SpCell.

In this case, the UE maintains the RRC connection without explicit signalling, i.e., the UE maintains the entire radio resource configuration.

Periods in time where neither "in-sync" nor "out-of-sync" is reported by layer 1 do not affect the evaluation of the number of consecutive "in-sync" or "out-of-sync" indications.

For detection of radio link failure, the UE shall:
1> upon T310 expiry in PCell; or
1> upon random access problem indication from MCG MAC while neither T300, T301, T304, T311 nor T319 are running; or
1> upon indication from MCG RLC that the maximum number of retransmissions has been reached:
2> if CA duplication is configured and activated; and for the corresponding logical channel allowedServingCells only includes SCell(s):
3> initiate the failure information procedure to report RLC failure.
2> else:
3> consider radio link failure to be detected for the MCG, i.e., RLF;
3> if AS security has not been activated:
4> perform the actions upon going to RRC_IDLE, with release cause 'other':
3> else if AS security has been activated but SRB2 and at least one DRB have not been setup:
4> perform the actions upon going to RRC_IDLE, with release cause 'RRC connection failure';

3> else:
4> initiate the connection re-establishment procedure.

The UE shall:
1> upon T310 expiry in PSCell; or
1> upon random access problem indication from SCG MAC; or
1> upon indication from SCG RLC that the maximum number of retransmissions has been reached:
2> if CA duplication is configured and activated; and for the corresponding logical channel allowedServingCells only includes SCell(s):
3> initiate the failure information procedure to report RLC failure.
2> else:
3> consider radio link failure to be detected for the SCG, i.e., SCG-RLF;
3> initiate the SCG failure information procedure to report SCG radio link failure.

Event A3 (Neighbor becomes offset better than SpCell) is described. Section 5.5.4.4 of 3GPP TS 38.331 V15.4.0 (2018-12) can be referred.

The UE shall:
1> consider the entering condition for this event to be satisfied when condition A3-1, as specified below, is fulfilled;
1> consider the leaving condition for this event to be satisfied when condition A3-2, as specified below, is fulfilled;
1> use the SpCell for Mp, Ofp and Ocp.

$Mn+Ofn+Ocn-Hys>Mp+Ofp+Ocp+Off$   Inequality A3-1 (Entering condition)

$Mn+Ofn+Ocn+Hys<Mp+Ofp+Ocp+Off$   Inequality A3-2 (Leaving condition)

The variables in the formula are defined as follows:
Mn is the measurement result of the neighbouring cell, not taking into account any offsets.
Ofn is the measurement object specific offset of the reference signal of the neighbour cell (i.e. offsetMO as defined within measObjectNR corresponding to the neighbour cell).
Ocn is the cell specific offset of the neighbour cell (i.e., cellIndividualOffset as defined within measObjectNR corresponding to the frequency of the neighbour cell), and set to zero if not configured for the neighbour cell.
Mp is the measurement result of the SpCell, not taking into account any offsets.
Ofp is the measurement object specific offset of the SpCell (i.e. offsetMO as defined within measObjectNR corresponding to the SpCell).
Ocp is the cell specific offset of the SpCell (i.e., cellIndividualOffset as defined within measObjectNR corresponding to the SpCell), and is set to zero if not configured for the SpCell.
Hys is the hysteresis parameter for this event (i.e., hysteresis as defined within reportConfigNR for this event).
Off is the offset parameter for this event (i.e., a3-Offset as defined within reportConfigNR for this event).
Mn, Mp are expressed in dBm in case of RSRP, or in dB in case of RSRQ and reference signal (RS) signal to interference plus noise ratio (SINR).
Ofn, Ocn, Ofp, Ocp, Hys, Off are expressed in dB.

Event A5 (SpCell becomes worse than threshold) and neighbor becomes better than threshold2) is described. Section 5.5.4.6 of 3GPP TS 38.331 V15.4.0 (2018-12) can be referred.

The UE shall:
1> consider the entering condition for this event to be satisfied when both condition A5-1 and condition A5-2, as specified below, are fulfilled;
1> consider the leaving condition for this event to be satisfied when condition A5-3 or condition A5-4, i.e. at least one of the two, as specified below, is fulfilled;
1> use the SpCell for Mp.

$Mp+Hys<Thresh1$   Inequality A5-1 (Entering condition 1)

$Mn+Ofn+Ocn-Hys>Thresh2$   Inequality A5-2 (Entering condition 2)

$Mp-Hys>Thresh1$   Inequality A5-3 (Leaving condition 1)

$Mn+Ofn+Ocn+Hys<Thresh2$   Inequality A5-4 (Leaving condition 2)

The variables in the formula are defined as follows:
Mp is the measurement result of the NR SpCell, not taking into account any offsets.
Mn is the measurement result of the neighbouring cell, not taking into account any offsets.
Ofn is the measurement object specific offset of the neighbour cell (i.e., offsetMO as defined within measObjectNR corresponding to the neighbour cell).
Ocn is the cell specific offset of the neighbour cell (i.e., cellIndividualOffset as defined within measObjectNR corresponding to the neighbour cell), and set to zero if not configured for the neighbour cell.
Hys is the hysteresis parameter for this event (i.e., hysteresis as defined within reportConfigNR for this event).
Thresh1 is the threshold parameter for this event (i.e., a5-Threshold) as defined within reportConfigNR for this event).
Thresh2 is the threshold parameter for this event (i.e., a5-Threshold2 as defined within reportConfigNR for this event).
Mn, Mp are expressed in dBm in case of RSRP, or in dB in case of RSRQ and RS-SINR.
Ofn, Ocn, Hys are expressed in dB.
Thresh1 is expressed in the same unit as Mp.
Thresh2 is expressed in the same unit as Mn.

Cell selection is described. Sections 5.2.3 and 5.2.6 of 3GPP TS 38.304 V15.2.0 (2018-12) can be referred.

Cell selection is performed by one of the following two procedures:
a) Initial cell selection (no prior knowledge of which RF channels are NR frequencies):
1. The UE shall scan all RF channels in the NR bands according to its capabilities to find a suitable cell.
2. On each frequency, the UE need only search for the strongest cell.
3. Once a suitable cell is found, this cell shall be selected.
b) Cell selection by leveraging stored information:
1. This procedure requires stored information of frequencies and optionally also information on cell parameters from previously received measurement control information elements or from previously detected cells.
2. Once the UE has found a suitable cell, the UE shall select it.
3. If no suitable cell is found, the initial cell selection procedure in a) shall be started.

Priorities between different frequencies or RATs provided to the UE by system information or dedicated signaling are not used in the cell selection process.

The cell selection criterion S is fulfilled when:

Srxlev>0 AND Squal>0 where:

$Srxlev = Q_{rxlevmeas} - (Q_{rxlevmin} + Q_{rxlevminoffset}) - P_{compensation} - Qoffset_{temp}$ $Squal = Q_{qualmeas} - (Q_{qualmin} + Q_{qualminoffset}) - Qoffset_{temp}$ Table 3 shows parameters for the cell selection criterion S.

TABLE 3

| | |
|---|---|
| Srxlev | Cell selection RX level value (dB) |
| Squal | Cell selection quality value (dB) |
| $Qoffset_{temp}$ | Offset temporarily applied to a cell (dB) |
| $Q_{rxlevmeas}$ | Measured cell RX level value (RSRP) |
| $Q_{qualmeas}$ | Measured cell quality value (RSRQ) |
| $Q_{rxlevmin}$ | Minimum required RX level in the cell (dBm). If the UE supports SUL frequency for this cell, Qrxlevmin is obtained from RxLevMinSUL, if present, in SIB1, SIB2 and SIB4, additionally, if $Q_{rxlevminoffsetcellSUL}$ is present in SIB3 and SIB4 for the concerned cell, this cell specific offset is added to the corresponding Qrxlevmin to achieve the required minimum RX level in the concerned cell; else Qrxlevmin is obtained from q-RxLevMin in SIB1 SIB1, SIB2 and SIB4, additionally, if $Q_{rxlevminoffsetcell}$ is present in SIB3 and SIB4 for the concerned cell, this cell specific offset is added to the corresponding Qrxlevmin to achieve the required minimum RX level in the concerned cell. |
| $Q_{qualmin}$ | Minimum required quality level in the cell (dB). Additionally, if $Q_{qualminoffsetcell}$ is signalled for the concerned cell, this cell specific offset is added to achieve the required minimum quality level in the concerned cell. |
| $Q_{rxlevminoffset}$ | Offset to the signalled $Q_{rxlevmin}$ taken into account in the Srxlev evaluation as a result of a periodic search for a higher priority PLMN while camped normally in a VPLMN. |
| $Q_{qualminoffset}$ | Offset to the signalled $Q_{qualmin}$ taken into account in the Squal evaluation as a result of a periodic search for a higher priority PLMN while camped normally in a VPLMN. |
| $P_{compensation}$ | If the UE supports the additionalPmax in the NR-NS-PmaxList, if present, in SIB1, SIB2 and SIB4: $\max(P_{EMAX1} - P_{PowerClass}, 0) - (\min(P_{EMAX2}, P_{PowerClass}) - \min(P_{EMAX1}, P_{PowerClass}))$ (dB); else: $\max(P_{EMAX1} - P_{PowerClass}, 0)$ (dB) |
| $P_{EMAX1}, P_{EMAX2}$ | Maximum TX power level of a UE may use when transmitting on the uplink in the cell (dBm) defined as $P_{EMAX}$. If UE supports SUL frequency for this cell, $P_{EMAX1}$ and $P_{EMAX2}$ are obtained from the p-Max for SUL in SIB1 and NR-NS-PmaxList for SUL respectively in SIB1, SIB2 and SIB4, else $P_{EMAX1}$ and $P_{EMAX2}$ are obtained from the p-Max and NR-NS-PmaxList respectively in SIB1, SIB2 and S1B4 for regular UL. |
| $P_{PowerClass}$ | Maximum RF output power of the UE (dBm) according to the UE power class. |

The signaled values $Q_{rxlevminoffset}$ and $Q_{qualminoffset}$ are only applied when a cell is evaluated for cell selection as a result of a periodic search for a higher priority PLMN while camped normally in a VPLMN. During this periodic search for higher priority PLMN, the UE may check the S criteria of a cell using parameter values stored from a different cell of this higher priority PLMN.

At reception of RRCRelease message to transition the UE to RRC_IDLE or RRC_INACTIVE, UE shall attempt to camp on a suitable cell according to redirectedCarrierInfo if included in the RRCRelease message. If the UE cannot find a suitable cell, the UE is allowed to camp on any suitable cell of the indicated RAT. If the RRCRelease message does not contain the redirectedCarrierInfo, UE shall attempt to select a suitable cell on an NR carrier. If no suitable cell is found according to the above, the UE shall perform cell selection using stored information in order to find a suitable cell to camp on.

When returning to RRC_IDLE state after UE moved to RRC_CONNECTED state from camped on any cell state, UE shall attempt to camp on an acceptable cell according to redirectedCarrierInfo, if included in the RRCRelease message. If the UE cannot find an acceptable cell, the UE is allowed to camp on any acceptable cell of the indicated RAT. If the RRCRelease message does not contain redirectedCarrierInfo UE shall attempt to select an acceptable cell on an NR frequency. If no acceptable cell is found according to the above, the UE shall continue to search for an acceptable cell of any PLMN in state any cell selection.

Network controlled mobility applies to UEs in RRC_CONNECTED and is categorized into two types of mobility: cell level mobility and beam level mobility.

Cell level mobility requires explicit RRC signaling to be triggered, i.e., handover.

Figure 10:
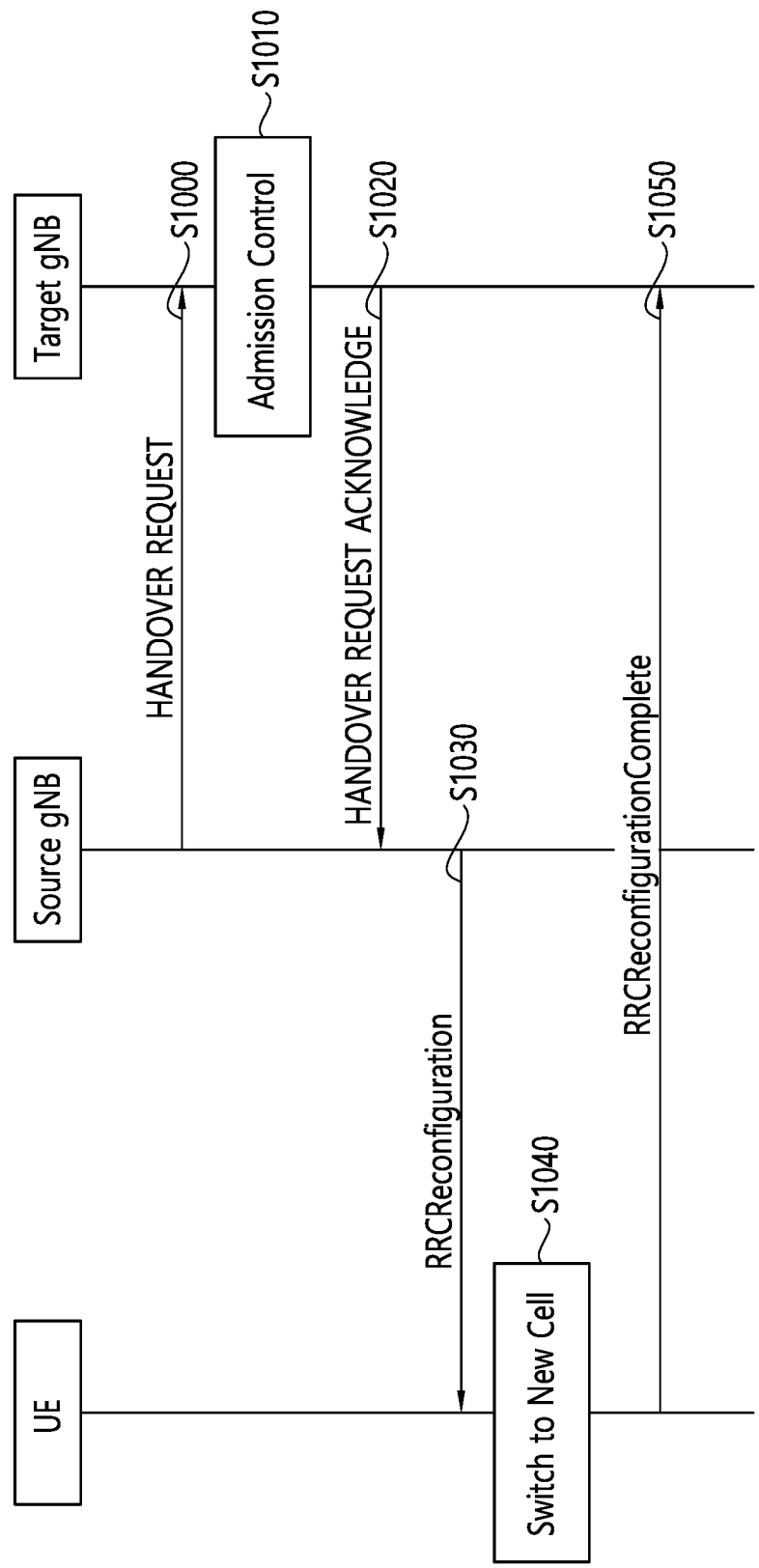
FIG. 10 shows an example of inter-gNB handover procedures to which the technical features of the present disclosure can be applied.

FIG. 10 shows an example of inter-gNB handover procedures to which the technical features of the present disclosure can be applied.

For inter-gNB handover, the signaling procedures consist of at least the following elemental components shown in FIG. 10.

In step S1000, the source gNB initiates handover and issues a Handover Request over the Xn interface.

In step S1010, the target gNB performs admission control. In step S1020, the target gNB provides the RRC configuration as part of the Handover Acknowledgement.

In step S1030, the source gNB provides the RRC configuration to the UE in the Handover Command. The Handover Command message includes at least cell ID and all information required to access the target cell so that the UE can access the target cell without reading system information. For some cases, the information required for contention-based and contention-free random access can be included in the Handover Command message. The access information to the target cell may include beam specific information, if any.

In step S1040, the UE moves the RRC connection to the target gNB. In step S1050, the UE replies the Handover Complete.

User data can also be sent in step S1050 if the grant allows.

The handover mechanism triggered by RRC requires the UE at least to reset the MAC entity and re-establish RLC. RRC managed handovers with and without PDCP entity re-establishment are both supported. For DRBs using RLC AM mode, PDCP can either be re-established together with a security key change or initiate a data recovery procedure without a key change. For DRBs using RLC UM mode and for SRBs, PDCP can either be re-established together with a security key change or remain as it is without a key change.

Data forwarding, in-sequence delivery and duplication avoidance at handover can be guaranteed when the target gNB uses the same DRB configuration as the source gNB.

Timer based handover failure procedure is supported in NR. RRC connection re-establishment procedure is used for recovering from handover failure.

Beam level mobility does not require explicit RRC signaling to be triggered. The gNB provides via RRC signaling the UE with measurement configuration containing configurations of SSB/channel state information (CSI) resources and resource sets, reports and trigger states for triggering channel and interference measurements and reports. Beam level mobility is then dealt with at lower layers by means of physical layer and MAC layer control signaling, and RRC is not required to know which beam is being used at a given point in time.

SSB-based beam level mobility is based on the SSB associated to the initial DL BWP and can only be configured for the initial DL BWPs and for DL BWPs containing the SSB associated to the initial DL BWP. For other DL BWPs, beam level mobility can only be performed based on CSI-RS.

It is expected that channel conditions in NR changes rapidly considering especially in beamforming system in high frequencies. This would put obstacles in UE performing RRC level handover procedures. Compared to LTE handover performance, higher handover performance degradation is also observed. Such degradation should be addressed.

As a way to resolve the above difficulties in NR radio condition, it is suggested to consider handover procedure based on a configured condition (i.e., conditional handover (CHO)). The motivation for the handover procedure based on a configured condition is to reduce the time to taken for transmission of measurement reporting and reception of handover command and handover preparation so that it would be possible to reduce the handover failure caused by not receiving handover command at a proper time.

Figure 11:
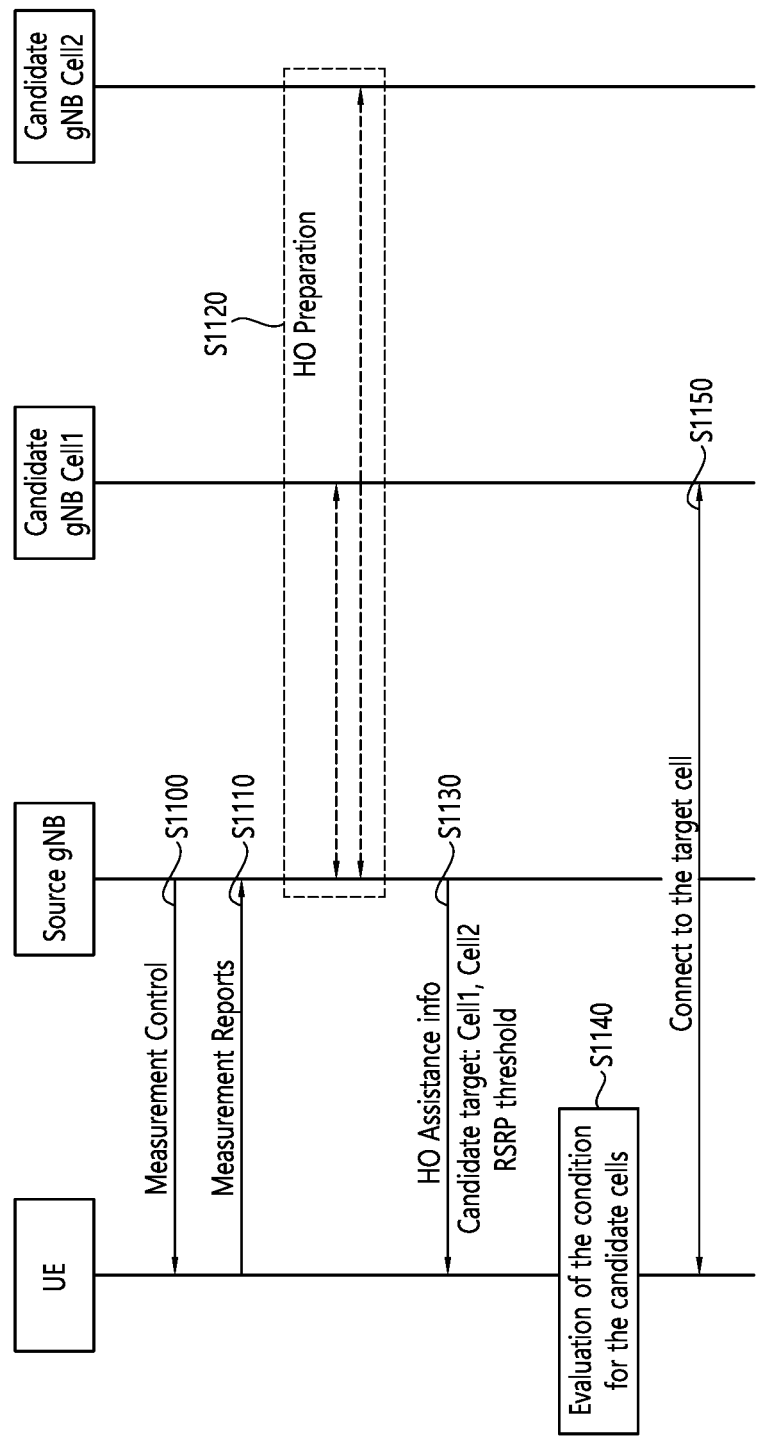
FIG. 11 shows an example of overall procedure for condition based autonomous handover procedure to which the technical features of the present disclosure can be applied.

FIG. 11 shows an example of overall procedure for condition based autonomous handover procedure to which the technical features of the present disclosure can be applied.

In step S1100, the source gNB may provide measurement control information to the UE. In step S1110, the UE may transmit measurements reports based on the measurement control information.

In step S1120, the source gNB may prepare condition based autonomous handover procedure with candidate cells (e.g., Cell1 and Cell2 in FIG. 11). In step S1130, the source gNB provides handover assistance information to the UE.

The UE is provided with handover assistance information which includes set of candidate cells and conditions (e.g., RSRP) for handover. It may be possible the network prepares the candidate cells and provide the handover assistance information without the measurement report from the UE if the network is able to know the trajectory or location of the UE based on, e.g., location reporting. Additionally, the network may determine the set of candidate cells based on the received measurement report.

There may be a concern on signaling overhead due to earlier triggering threshold. Measurement reporting may be reduced if an approach similar to blacklisted cells is introduced. In other words, if the UE reports on one cell, the network may prepare the multiple cells which is in proximity of the reported cell and provide the list of cells which are prepared. Then, the UE may not report on the cells even if the condition for measurement reporting is triggered.

The handover assistance information may be cell quality based conditions and the configuration which may be used in a target cell. The handover assistance information may include configuration for one or more candidate cells.

In step S1140, if the UE receives the handover assistance information, the UE initiates to evaluate the conditions for the candidate cell list to determine whether to perform handover procedure to one of the candidate cells.

In step S1150, if the condition is met, the UE performs connecting to the prepared target cell.

For this procedure, since the source gNB may not know the exact timing of UE detaching from the source gNB, there may be some unnecessary downlink transmissions from the network to the UE. To address this issue, the target gNB may indicate to source gNB that the UE has completed handover successfully so that the source gNB does not transmit to the UE anymore. In addition, if the source gNB does not receive the response for the transmitted data, the source gNB may not transmit the data in downlink considering the handover situation.

As a reserving the resource in one or more candidate cell is burdensome to the network, it may be possible for the network to manage the configuration efficiently. For instance, based on the timer associated with validity of the handover assistance information, the network and UE may discard the configuration associated with the conditional handover. In addition, based on measurement report from the UE, network may configure, modify and/or discard the configuration.

Furthermore, if the UE successfully connects to the target cell, the target cell may inform to the source cell to discard the reserved configuration of the other candidate cell.

The make-before-break (MBB) and RACH-less handover are considered to reduce handover interruption in LTE. For example, MBB retains the link of source cell during handover procedure. The source cell transmits data to UE continuously until the handover is completed, so the interruption may be reduced. However, the channel quality of source cell is getting worse quickly specially in high frequency and the stopping point of data transmission between source cell and UE is not cleared, so the UE may not receive the data from the source cell or source cell may stop transmitting data early to UE when MBB is used. It can cause loss of data and handover interruption. In addition, The RACH-less handover contains UL grant for handover complete message in mobility control information via RRC Connection Reconfiguration message. It can help to skip the RACH procedure and reduce the interruption. However, RACH-less handover is only used for time aligned target cell that UE reuse the TA value. Moreover, in NR, the UL grant for target cell is required to consider beam forming. The received UL grant for target cell would not be suitable when the actual handover is performed. Therefore, it is hard to achieve Oms interruption with only applying MBB and RACH-less handover.

To achieve the Oms interruption handover, dual connectivity (DC) based handover is considered. The sequence of Oms interruption handover with single cell is regarded as following steps.

Step1: UE sends measurement report to the source gNB.
Step2: UE receives reconfiguration for adding target cell as SCG PSCell.
Step3 (Optional): UE sends measurement report to the master gNB.
Step4: UE receives role change request via reconfiguration message. The source cell becomes secondary gNB and the target cell becomes master gNB.
Step5: UE may receive a message to release SgNB.

From the above sequence, role change is performed after UE reported measurement reports. According to the timing of measurement reports, several issues can be considered.

At first, if UE reports the measurement reports when serving cell is lower than target cell or a threshold, MgNB is likely to be dropped before the role change. Especially, NR considers high frequency and beam forming. The channel quality of high frequency cell is attenuated quickly. When gNB of high frequency cell sends role change request message and receives role change acknowledge message, radio link failure (RLF) may be already occurred. So, the target cell may need to be added earlier and role change should be performed quickly. However, sending role change request and receiving role change acknowledge message is required for the role change.

On the other hand, if UE reports the measurement reports when target cell is higher than a threshold, role change can be performed even the channel quality of PCell is better than PSCell. It may cause ping-pong and waste resources for signaling.

Moreover, there is no event which can compare the PCell and PSCell. So, if once the target cell is added as PSCell, it would be hard to compare the channel quality of source cell (i.e., PCell) and target cell (i.e., PSCell).

In legacy handover, UE reports measurement reports and receives handover command when source cell decides to handover. However, in DC based handover, UE receives SCG addition at first and UE receives role change request via the next RRC connection reconfiguration message. Likewise, the MgNB sends/receives SgNB addition/acknowledge message to/from the target cell and MgNB sends/receives Role Change Request to/from SgNB. Therefore, the DC based handover can cause delayed handover due to multiple handshakes between the source gNB and target gNB.

The conditional handover is considered to reduce the latency during the handover. If DC based handover is combined with conditional handover, the number of handshakes between the gNBs can be reduced and handover failure can be reduced. For example, UE reports measurement reports when the target cell is better than a threshold. The source cell adds the target cell as the SgNB and prepares the role change simultaneously when channel quality of the source cell is still in good condition. After that UE receives role change trigger condition (e.g., PSCell is better than PCell) and triggers the role change when it is satisfied. The gNBs can change the role immediately because gNBs prepared the role change in advanced. It can reduce the role change latency and handover/role change failure could be reduced.

Even though some conditional mobility have been configured properly, radio link problem on the serving cell may suddenly occur based on radio link monitoring (RLM). In this case, the UE may not trigger the configured conditional mobility, because radio resource management (RRM) measurement results of the serving cell is still good and/or target cell quality is not yet very high enough to perform conditional mobility.

However, if the radio link problem is detected from the serving cell, even though the target cell quality is not very good, but if the target cell quality is merely suitable for mobility, it may be better to perform the mobility to change the serving cell to the target cell. If not, the UE may experience the service interruption due to the radio link problem on the serving cell.

According to implementations of the present disclosure, for a UE which has been configured with the conditional mobility, when the UE detects a serving cell problem, the UE may relax the mobility condition related to the corresponding serving cell so that the mobility can be performed more easily.

Implementations of the present disclosure can be applied to conditional mobility, in which one or more candidate cells are determined based on condition first, and actual mobility is performed towards one of the candidate cells. The conditional mobility may include conditional handover, conditional DC based handover, and/or conditional SCG change, etc.

The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings.

Figure 12:
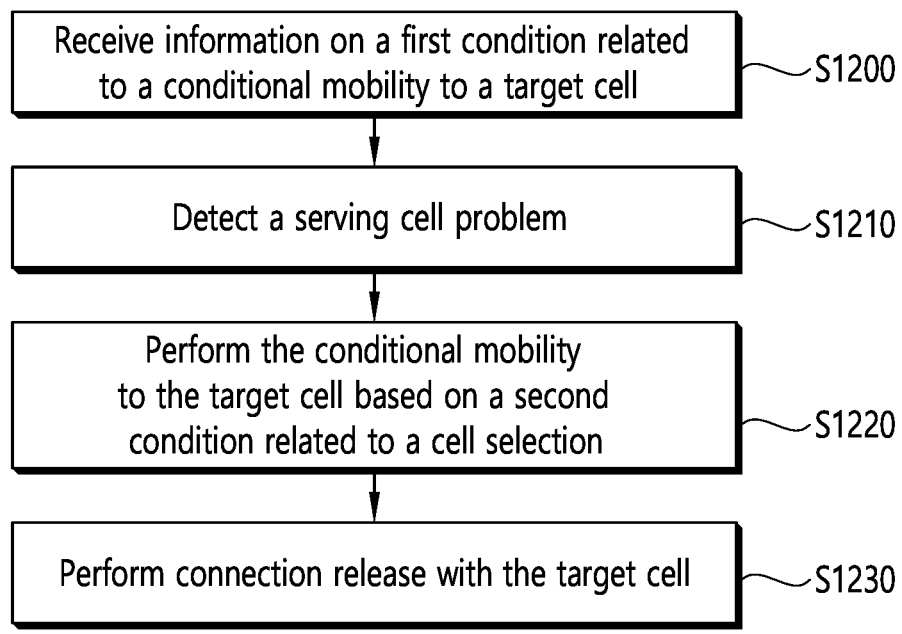
FIG. 12 shows an example of a method for a wireless device to which the technical features of the present disclosure can be applied.

FIG. 12 shows an example of a method for a wireless device to which the technical features of the present disclosure can be applied.

In step S1200, the wireless device receives information on a first condition related to a conditional mobility to a target cell;

In some implementations, the first condition may be configured by comparison between a measurement result of the target cell and a measurement result of a serving cell. For example, the first condition may be that the measurement result of the target cell is better than the measurement result of the serving cell by an offset. For example, the first condition may be event A3.

In some implementations, the first condition may include a first part related to the serving cell with a first threshold and a second part related to the target cell with a second threshold. For example, the first condition may be event A5.

In some implementations, the first condition may be configured by a threshold for the target cell.

In some implementations, the information on the first condition may be received via a configuration for the conditional mobility. The configuration may include a list of candidate target cells including the target cell. For example, the list of candidate target cells may include an ID of the candidate target cells. The configuration may include an ID of the serving cell and/or type of the conditional mobility.

In step S1210, the wireless device detects a serving cell problem.

In some implementations, the serving cell problem may be detected upon expiry of a timer, which starts to running upon receiving N-consecutive out-of-sync indications for the serving cell from lower layers.

In some implementations, the serving cell problem may be detected upon receiving a random access problem indication from MCG MAC.

In some implementations, the serving cell problem may be detected upon receiving an indication from MCG RLC that a maximum number of retransmissions has been reached.

In some implementations, the serving cell problem may be detected upon receiving N-consecutive out-of-sync indications for the serving cell from lower layers, In some implementations, the serving cell problem may be detected upon receiving a random access problem indication from SCG MAC.

In some implementations, the serving cell problem may be detected upon receiving an indication from SCG RLC that a maximum number of retransmissions has been reached.

In some implementations, the serving cell problem may be detected upon re-configuration with sync failure of a MCG.

In some implementations, the serving cell problem may be detected upon re-configuration with sync failure of a SCG.

In some implementations, the serving cell problem may be detected upon receiving an integrity check failure indication from lower layers regarding SRB1 and/or SRB2.

In some implementations, the serving cell problem may be detected upon RRC connection reconfiguration failure.

In some implementations, the serving cell may be a PCell.

In step S1220, the wireless device performs the conditional mobility to the target cell based on a second condition related to a cell selection.

In some implementations, the second condition may correspond to a cell selection criterion. The conditional mobility to the target cell may be performed upon that the cell selection criterion is satisfied. The cell selection criterion may be satisfied upon that a measurement result of the target cell is above a default threshold.

For example, the wireless device may perform the conditional mobility to the target cell upon that (e.g., when) a cell selection criterion S is satisfied, e.g., the measurement result of the target cell is above the default threshold, regardless of a quality of the serving cell, e.g., PCell. In other words, the conditional mobility condition may be ignored, but nevertheless the conditional mobility can be performed by using a cell selection criterion S.

For example, the target cell may be a suitable cell upon cell selection.

In some implementations, the conditional mobility may include a conditional serving cell change, a conditional serving cell addition and/or a conditional serving cell release.

In step S1230, the wireless device performs connection release with the target cell.

In some implementations, the wireless device may be in communication with at least one of a mobile device, a network, and/or autonomous vehicles other than the wireless device.

Figure 13:
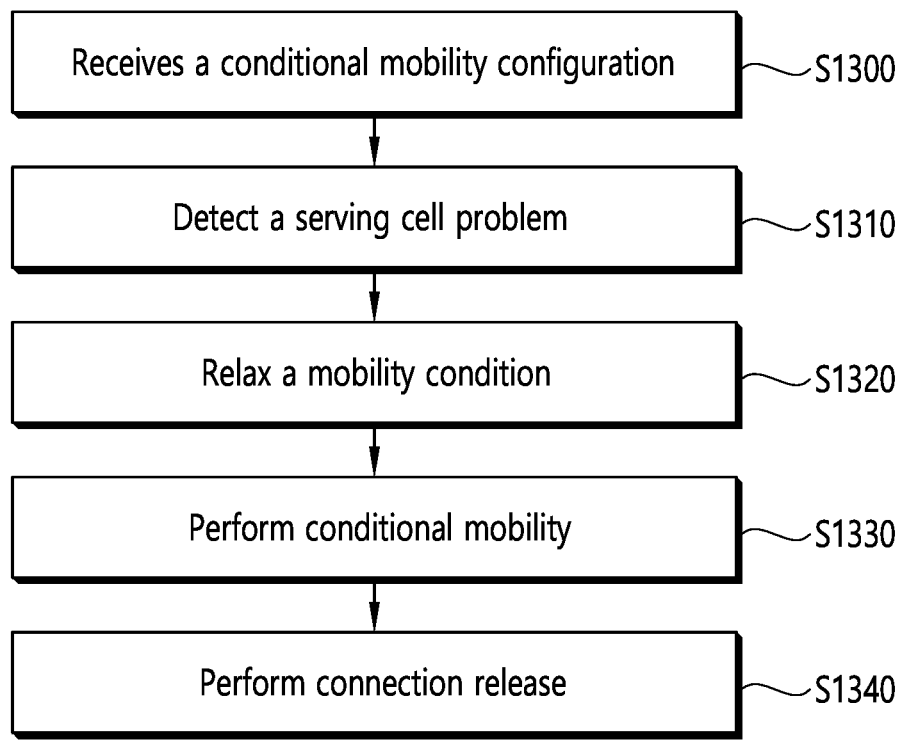
FIG. 13 shows an example of a method for UE to perform conditional mobility to which the technical features of the present disclosure can be applied.

FIG. 13 shows an example of a method for UE to perform conditional mobility to which the technical features of the present disclosure can be applied.

In step S1300, the UE receives a conditional mobility configuration.

In some implementations, the conditional mobility configuration may include a list which consists of one or more candidate cells. For example, the list may include ID of the one or more candidate cells).

In some implementations, the conditional mobility configuration may include the mobility condition for one or more candidate cells. The mobility condition may be configured in various forms as follows:

For example, the mobility condition may be configured by comparison between neighbor cell and serving cell. For example, the mobility condition may be event A3, i.e., neighbor becomes offset better than SpCell.

For example, the mobility condition may be configured by a first part related to the serving cell and a second part related to the neighbor cell. For example, the first part related to the serving cell may be a first condition with threshold 1 for the serving cell, and the second part related to the neighbor cell may be a second condition with threshold 2 for the neighbor cell. For example, the mobility condition may be event A5, i.e., SpCell becomes worse than threshold1 and neighbor becomes better than threshold2.

For example, the mobility condition may be configured by including a threshold for neighbor cell.

In some implementations, the conditional mobility configuration may further include the source cell identity and/or the type of mobility.

In some implementations, the conditional mobility configuration may be provided by RRC dedicated signaling and/or broadcast information such as system information.

In step S1310, the UE detects a serving cell problem. When at least one of the following events occur, the UE may consider the serving cell problem is detected.
1) Upon receiving N-consecutive "out-of-sync" indications for a serving cell from lower layers, e.g., physical layer, the UE may consider the serving cell problem is detected for the serving cell. N may be a constant and can be set to 1.
2) Upon receiving N-consecutive "out-of-sync" indications for a serving cell from lower layers, the UE may start a timer. When the timer expires, the UE may consider the serving cell problem is detected for the serving cell.
3) Upon random access problem indication from MCG MAC, the UE may consider the serving cell problem is detected for PCell.
4) Upon random access problem indication from SCG MAC, the UE may consider the serving cell problem is detected for PSCell.
5) Upon indication from MCG RLC that the maximum number of retransmissions has been reached, the UE may consider the serving cell problem is detected for PCell.
6) Upon indication from SCG RLC that the maximum number of retransmissions has been reached, the UE may consider the serving cell problem is detected for PSCell.
7) Upon re-configuration with sync failure of the MCG, the UE may consider the serving cell problem is detected for PCell.
8) Upon re-configuration with sync failure of the SCG, the UE consider the serving cell problem is detected for PSCell.

9) Upon integrity check failure indication from lower layers concerning SRB1 or SRB2, the UE may consider the serving cell problem is detected for PCell.
10) Upon an RRC connection reconfiguration failure, the UE may consider the serving cell problem is detected for PCell.

In step S1320, the UE relaxes the mobility condition. Examples of how to relax the mobility condition are described below. The relaxation of the mobility condition may depend on how the mobility condition is configured.

1) In some implementations, if the mobility condition is configured by comparison between neighbor cell and serving cell, e.g., event A3, the UE may change the mobility condition to the form of comparison between neighbor cell and a default threshold.

For example, for PCell change, e.g., handover, a configured mobility condition may be 'Neighbor becomes better than PCell' and/or 'Neighbor becomes offset better than SpCell'. When the UE detects the serving cell problem for PCell, the UE may relax the mobility condition by changing the mobility condition to 'Neighbor becomes better than default threshold'. This means that the UE can perform the PCell change if neighbor becomes better than the default threshold, regardless of PCell quality.

2) In some implementations, if configured mobility condition is composed of the first part related to the serving cell and second part related to the neighbor cell, e.g., event A5, the UE may remove the first part from the configured mobility condition.

For example, for PCell change, e.g., handover, a configured mobility condition may be 'PCell becomes worse than threshold 1 and neighbor becomes better than threshold 2'. When the UE detects the serving cell problem for PCell, the UE may relax the mobility condition by removing the first part from the mobility condition.

That is, the relaxed mobility condition may be "neighbor becomes better than threshold 2". That is, the UE can perform the PCell change if neighbor becomes better than threshold2, regardless of measurement results of the PCell.

3) In some implementations, if configured mobility condition includes a threshold for neighbor cell, the UE may scale down the threshold related to the neighbor cell.

For example, for PSCell change, a configured mobility condition may be 'neighbor becomes better than a threshold'. When the UE detects the serving cell problem for PSCell, the UE may relax the mobility condition by scaling down the threshold. This means that the UE can perform the PSCell change if neighbor becomes better than scaled down threshold, i.e., lower threshold.

4) In some implementations, the UE may ignore the configured mobility condition and perform the mobility related to the serving cell, if the target cell satisfies the minimum requirement.

For example, the minimum requirement may be 'the neighbor cell quality is higher than a default threshold.' Or, cell selection criterion (criterion S) may also be used as the minimum requirement. That is, when the UE detects a serving cell problem and the target cell satisfies the minimum requirement, the UE can perform the corresponding mobility to the target cell.

For example, if the mobility condition is configured by comparison between neighbor cell and serving cell, e.g., event A3, the UE may use another mobility condition rather than the mobility condition configured by the conditional mobility. Another mobility condition may correspond to the minimum requirement.

For example, for PCell change, e.g., handover, a configured mobility condition may be 'Neighbor becomes better than PCell' and/or 'Neighbor becomes offset better than SpCell'. When the UE detects the serving cell problem for PCell, the UE may ignore the configured mobility condition and use the minimum requirement 'the neighbor cell quality is higher than a default threshold' to perform mobility to the target cell. This means that the UE can perform the PCell change if the neighbor cell quality becomes better than the default threshold, regardless of PCell quality.

Each option for relaxation of the mobility condition described above may be applied independently. Or, each option for relaxation of the mobility condition described above may be used with other options.

In step S1330, for the UE which has been configured with the conditional mobility, the UE performs the mobility to the target cell, if the mobility condition is met.

In some implementations, the mobility may include at least one of (conditional) serving cell change, (conditional) cell addition, and/or (conditional) cell release.

In step S1340, after performing mobility to the target cell, the UE performs connection release procedure with the network, e.g., gNB. The UE may receive RRC release message from the gNB. Upon receiving the RRC release message, the UE may enter RRC_IDLE and/or RRC_INACTIVE. While in the RRC_IDLE and/or RRC_INACTIVE, the UE may perform cell reselection.

An example of UE operations according to implementations of the present disclosure is as follows.

Upon selecting a suitable NR cell, the UE shall:
1> ensure having valid and up to date essential system information;
1> stop timer T311;
1> if T390 is running:
2> stop timer T390 for all access categories;
2> perform the actions regarding barring alleviation;
1> if attemptCHO is configured; and
1> if the selected cell is one of the candidate cells in VarCHO-Config:
2> apply the stored cho-RRCReconfig associated to the selected cell;
2> remove all the entries within VarCHO-Config, if any;
2> perform the actions regarding reception of an RRCReconfiguration by the UE (i.e., perform conditional handover);
1> else:
2> remove all the entries within VarCHO-Config, if any;
2> start timer T301;
2> apply the default L1 parameter values as specified in corresponding physical layer specifications except for the parameters for which values are provided in SIB1;
2> apply the default MAC Cell Group configuration;
2> apply the CCCH configuration;
2> apply the timeAlignmentTimerCommon included in SIB1;
2> initiate transmission of the RRCReestablishmentRequest message;

This procedure applies also if the UE returns to the source PCell.

Upon selecting an inter-RAT cell, the UE shall:
1> perform the actions upon going to RRC_IDLE, with release cause 'RRC connection failure'.

In other words, if attemptCHO is present in the CHO-Config information element (IE), the UE shall perform conditional handover if selected cell is a conditional handover candidate cell while timer T311 is running.

An example of UE operations according to implementations of the present disclosure is as follows.
1) The UE receives a conditional mobility configuration from network. The source cell of mobility is a PCell and a target cell of mobility is a neighbor cell C, respectively. The type of mobility is set to handover. The mobility condition is 'Neighbor becomes offset better than PCell', e.g., Event A3.
2) The UE receives N-consecutive out-of-sync indications from physical layer. Then, the UE may apply the relaxed mobility condition that 'Neighbor becomes better than default threshold', instead of configured mobility condition. Or, the UE may ignore the configured mobility condition, and use the minimum requirement that 'Neighbor becomes better than default threshold'.
3) The measurement results of the target cell, i.e., cell C, already satisfies the relaxed mobility condition and/or minimum requirement. So, the UE immediately performs the handover to the cell C.

The present disclosure may be applied to various future technologies, such as AI.

<AI>

AI refers to artificial intelligence and/or the field of studying methodology for making it. Machine learning is a field of studying methodologies that define and solve various problems dealt with in AI. Machine learning may be defined as an algorithm that enhances the performance of a task through a steady experience with any task.

An artificial neural network (ANN) is a model used in machine learning. It can mean a whole model of problem-solving ability, consisting of artificial neurons (nodes) that form a network of synapses. An ANN can be defined by a connection pattern between neurons in different layers, a learning process for updating model parameters, and/or an activation function for generating an output value. An ANN may include an input layer, an output layer, and optionally one or more hidden layers. Each layer may contain one or more neurons, and an ANN may include a synapse that links neurons to neurons. In an ANN, each neuron can output a summation of the activation function for input signals, weights, and deflections input through the synapse. Model parameters are parameters determined through learning, including deflection of neurons and/or weights of synaptic connections. The hyper-parameter means a parameter to be set in the machine learning algorithm before learning, and includes a learning rate, a repetition number, a mini batch size, an initialization function, etc. The objective of the ANN learning can be seen as determining the model parameters that minimize the loss function. The loss function can be used as an index to determine optimal model parameters in learning process of ANN.

Machine learning can be divided into supervised learning, unsupervised learning, and reinforcement learning, depending on the learning method. Supervised learning is a method of learning ANN with labels given to learning data. Labels are the answers (or result values) that ANN must infer when learning data is input to ANN. Unsupervised learning can mean a method of learning ANN without labels given to learning data. Reinforcement learning can mean a learning method in which an agent defined in an environment learns to select a behavior and/or sequence of actions that maximizes cumulative compensation in each state.

Machine learning, which is implemented as a deep neural network (DNN) that includes multiple hidden layers among ANN, is also called deep learning. Deep learning is part of machine learning. In the following, machine learning is used to mean deep learning.

Figure 14:
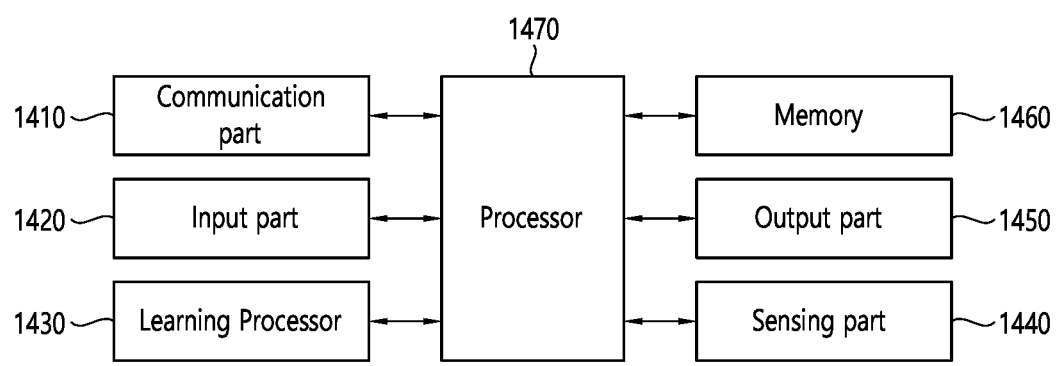
FIG. 14 shows an example of an AI device to which the technical features of the present disclosure can be applied.

FIG. 14 shows an example of an AI device to which the technical features of the present disclosure can be applied.

The AI device 1400 may be implemented as a stationary device or a mobile device, such as a TV, a projector, a mobile phone, a smartphone, a desktop computer, a notebook, a digital broadcasting terminal, a PDA, a PMP, a navigation device, a tablet PC, a wearable device, a set-top box (STB), a digital multimedia broadcasting (DMB) receiver, a radio, a washing machine, a refrigerator, a digital signage, a robot, a vehicle, etc.

Referring to FIG. 14, the AI device 1400 may include a communication part 1410, an input part 1420, a learning processor 1430, a sensing part 1440, an output part 1450, a memory 1460, and a processor 1470.

The communication part 1410 can transmit and/or receive data to and/or from external devices such as the AI devices and the AI server using wire and/or wireless communication technology. For example, the communication part 1410 can transmit and/or receive sensor information, a user input, a learning model, and a control signal with external devices. The communication technology used by the communication part 1410 may include a global system for mobile communication (GSM), a code division multiple access (CDMA), an LTE/LTE-A, a 5G, a WLAN, a Wi-Fi, Bluetooth™, radio frequency identification (RFID), infrared data association (IrDA), ZigBee, and/or near field communication (NFC).

The input part 1420 can acquire various kinds of data. The input part 1420 may include a camera for inputting a video signal, a microphone for receiving an audio signal, and a user input part for receiving information from a user. A camera and/or a microphone may be treated as a sensor, and a signal obtained from a camera and/or a microphone may be referred to as sensing data and/or sensor information. The input part 1420 can acquire input data to be used when acquiring an output using learning data and a learning model for model learning. The input part 1420 may obtain raw input data, in which case the processor 1470 or the learning processor 1430 may extract input features by preprocessing the input data.

The learning processor 1430 may learn a model composed of an ANN using learning data. The learned ANN can be referred to as a learning model. The learning model can be used to infer result values for new input data rather than learning data, and the inferred values can be used as a basis for determining which actions to perform. The learning processor 1430 may perform AI processing together with the learning processor of the AI server. The learning processor 1430 may include a memory integrated and/or implemented in the AI device 1400. Alternatively, the learning processor 1430 may be implemented using the memory 1460, an external memory directly coupled to the AI device 1400, and/or a memory maintained in an external device.

The sensing part 1440 may acquire at least one of internal information of the AI device 1400, environment information of the AI device 1400, and/or the user information using various sensors. The sensors included in the sensing part 1440 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a light detection and ranging (LIDAR), and/or a radar.

The output part 1450 may generate an output related to visual, auditory, tactile, etc. The output part 1450 may include a display unit for outputting visual information, a speaker for outputting auditory information, and/or a haptic module for outputting tactile information.

The memory 1460 may store data that supports various functions of the AI device 1400. For example, the memory 1460 may store input data acquired by the input part 1420, learning data, a learning model, a learning history, etc.

The processor 1470 may determine at least one executable operation of the AI device 1400 based on information determined and/or generated using a data analysis algorithm and/or a machine learning algorithm. The processor 1470 may then control the components of the AI device 1400 to perform the determined operation. The processor 1470 may request, retrieve, receive, and/or utilize data in the learning processor 1430 and/or the memory 1460, and may control the components of the AI device 1400 to execute the predicted operation and/or the operation determined to be desirable among the at least one executable operation. The processor 1470 may generate a control signal for controlling the external device, and may transmit the generated control signal to the external device, when the external device needs to be linked to perform the determined operation. The processor 1470 may obtain the intention information for the user input and determine the user's requirements based on the obtained intention information. The processor 1470 may use at least one of a speech-to-text (STT) engine for converting speech input into a text string and/or a natural language processing (NLP) engine for acquiring intention information of a natural language, to obtain the intention information corresponding to the user input. At least one of the STT engine and/or the NLP engine may be configured as an ANN, at least a part of which is learned according to a machine learning algorithm. At least one of the STT engine and/or the NLP engine may be learned by the learning processor 1430 and/or learned by the learning processor of the AI server, and/or learned by their distributed processing. The processor 1470 may collect history information including the operation contents of the AI device 1400 and/or the user's feedback on the operation, etc. The processor 1470 may store the collected history information in the memory 1460 and/or the learning processor 1430, and/or transmit to an external device such as the AI server. The collected history information can be used to update the learning model. The processor 1470 may control at least some of the components of AI device 1400 to drive an application program stored in memory 1460. Furthermore, the processor 1470 may operate two or more of the components included in the AI device 1400 in combination with each other for driving the application program.

Figure 15:
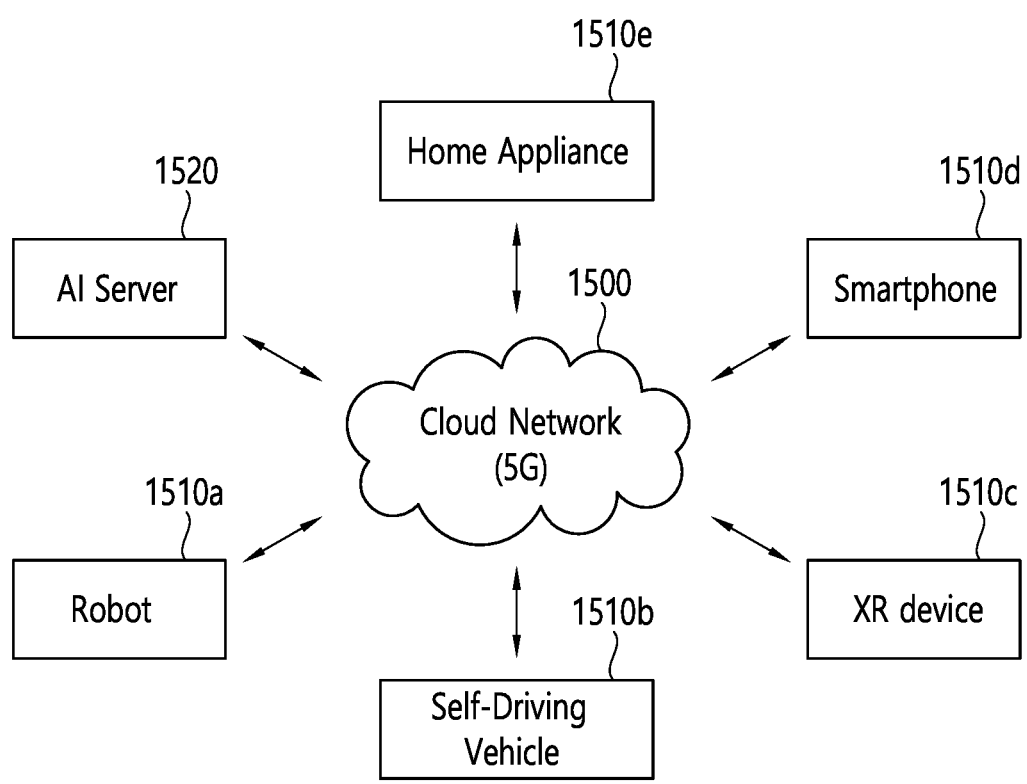
FIG. 15 shows an example of an AI system to which the technical features of the present disclosure can be applied.

FIG. 15 shows an example of an AI system to which the technical features of the present disclosure can be applied.

Referring to FIG. 15, in the AI system, at least one of an AI server 1520, a robot 1510a, an autonomous vehicle 1510b, an XR device 1510c, a smartphone 1510d and/or a home appliance 1510e is connected to a cloud network 1500. The robot 1510a, the autonomous vehicle 1510b, the XR device 1510c, the smartphone 1510d, and/or the home appliance 1510e to which the AI technology is applied may be referred to as AI devices 1510a to 1510e.

The cloud network 1500 may refer to a network that forms part of a cloud computing infrastructure and/or resides in a cloud computing infrastructure. The cloud network 1500 may be configured using a 3G network, a 4G or LTE network, and/or a 5G network. That is, each of the devices 1510a to 1510e and 1520 consisting the AI system may be connected to each other through the cloud network 1500. In particular, each of the devices 1510a to 1510e and 1520 may communicate with each other through a base station, but may directly communicate with each other without using a base station.

The AI server 1520 may include a server for performing AI processing and a server for performing operations on big data. The AI server 1520 is connected to at least one or more of AI devices constituting the AI system, i.e., the robot 1510a, the autonomous vehicle 1510b, the XR device 1510c, the smartphone 1510d and/or the home appliance 1510e through the cloud network 1500, and may assist at least some AI processing of the connected AI devices 1510a to 1510e. The AI server 1520 can learn the ANN according to the machine learning algorithm on behalf of the AI devices 1510a to 1510e, and can directly store the learning models and/or transmit them to the AI devices 1510a to 1510e. The AI server 1520 may receive the input data from the AI devices 1510a to 1510e, infer the result value with respect to the received input data using the learning model, generate a response and/or a control command based on the inferred result value, and transmit the generated data to the AI devices 1510a to 1510e. Alternatively, the AI devices 1510a to 1510e may directly infer a result value for the input data using a learning model, and generate a response and/or a control command based on the inferred result value.

Various embodiments of the AI devices 1510a to 1510e to which the technical features of the present disclosure can be applied will be described. The AI devices 1510a to 1510e shown in FIG. 15 can be seen as specific embodiments of the AI device 1400 shown in FIG. 14.

The present disclosure can have various advantageous effects.

For example, the wireless device can autonomously change a serving cell as soon as a serving cell problem happens if there is a suitable target cell.

For example, if a target cell is configured for conditional mobility, upon detecting the serving cell problem, the wireless device can autonomously change a serving cell enough that the target cell is suitable upon cell selection, i.e., the target cell satisfies cell selection criterion S.

For example, if the radio link problem is detected from a serving cell, even though the target cell quality is not very good, but if the target cell quality is suitable for mobility, mobility to the target cell can be performed regardless of the serving cell quality.

For example, the wireless device can avoid radio link failure and continue data transmission/reception without any interruption.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

Claims in the present disclosure can be combined in a various way. For instance, technical features in method claims of the present disclosure can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method performed by a wireless device adapted to operate in a wireless communication system, the method comprising:
   evaluating a condition of each of a number of candidate target cells for conditional mobility,
   wherein the condition of each candidate target cell and a configuration of each candidate cell is obtained via a conditional mobility configuration, and
   wherein the condition is configured by one of i) a comparison between a measurement result of each candidate target cell and a measurement result of a serving cell, or ii) a comparison between a measurement result of a serving cell with respect to a first threshold and a comparison between a measurement result of each candidate target cell with respect to a second threshold;
   upon re-configuration with sync failure of a master cell group (MCG), initiating a connection re-establishment procedure;
   upon initiating the connection re-establishment procedure, performing a cell selection;
   based on a selected cell due to the cell selection being one of the candidate target cells, applying a configuration associated with the selected cell;
   receiving a radio resource control (RRC) release message from the selected cell; and
   entering an RRC idle state or an RRC inactive state based on the RRC release message,
   wherein the selected cell is selected based on a cell selection criterion S being satisfied for the selected cell.

2. The method of claim 1, wherein the cell selection criterion S is satisfied based on a measurement result of the selected cell being above a default threshold.

3. The method of claim 2, wherein the configuration associated with the selected cell is applied regardless of whether a condition for the selected cell is satisfied or not.

4. The method of claim 1, wherein the conditional mobility configuration includes a list of each candidate target cell including the selected cell.

5. The method of claim 4, wherein the list of each candidate target cell includes an identifier (ID) of each candidate target cell.

6. The method of claim 1, wherein the conditional mobility configuration includes an ID of the serving cell and/or type of the conditional mobility.

7. The method of claim 1, wherein the conditional mobility includes a conditional serving cell change, a conditional serving cell addition and/or a conditional serving cell release.

8. The method of claim 1, wherein the wireless device is in communication with at least one of a mobile device, a network, and/or autonomous vehicles other than the wireless device.

9. A wireless device adapted to operate in a wireless communication system, the wireless device comprising:
   at least one transceiver;
   at least one processor; and
   at least one computer memory operably connectable to the at least one processor and storing instructions that, based on being executed by the at least one processor, perform operations comprising:
   evaluating a condition of each of a number of candidate target cells for conditional mobility,
   wherein the condition of each candidate target cell and a configuration of each candidate cell is obtained via a conditional mobility configuration, and
   wherein the condition is configured by one of i) a comparison between a measurement result of each candidate target cell and a measurement result of a serving cell, or ii) a comparison between a measurement result of a serving cell with respect to a first threshold and a comparison between a measurement result of each candidate target cell with respect to a second threshold;
   upon re-configuration with sync failure of a master cell group (MCG), initiating a connection re-establishment procedure;
   upon initiating the connection re-establishment procedure, performing a cell selection;
   based on a selected cell due to the cell selection being one of the candidate target cells, applying a configuration associated with the selected cell;
   receiving a radio resource control (RRC) release message from the selected cell; and
   entering an RRC idle state or an RRC inactive state based on the RRC release message,
   wherein the selected cell is selected based on a cell selection criterion S being satisfied for the selected cell.

10. A non-transitory computer readable medium (CRM) storing instructions that, based on being executed by at least one processor, perform operations comprising:
   evaluating a condition of each of a number of candidate target cells for conditional mobility,
   wherein the condition of each candidate target cell and a configuration of each candidate cell is obtained via a conditional mobility configuration, and
   wherein the condition is configured by one of i) a comparison between a measurement result of each candidate target cell and a measurement result of a serving cell, or ii) a comparison between a measurement result of a serving cell with respect to a first threshold and a comparison between a measurement result of each candidate target cell with respect to a second threshold;
   upon re-configuration with sync failure of a master cell group (MCG), initiating a connection re-establishment procedure;
   upon initiating the connection re-establishment procedure, performing a cell selection;
   based on a selected cell due to the cell selection being one of the candidate target cells, applying a configuration associated with the selected cell;
   receiving a radio resource control (RRC) release message from the selected cell; and
   entering an RRC idle state or an RRC inactive state based on the RRC release message,
   wherein the selected cell is selected based on a cell selection criterion S being satisfied for the selected cell.

* * * * *